(12) United States Patent
Im et al.

(10) Patent No.: US 7,889,809 B2
(45) Date of Patent: Feb. 15, 2011

(54) WEIGHT VECTOR CALCULATION UNIT FOR BEAMFORMING USING RECEIVED AND/OR INTEGRATED SIGNAL WITHOUT TRAINING SIGNAL

(75) Inventors: Heung-Jae Im, Seoul (KR); Sung-Won Choi, Seoul (KR); Taeyoul Oh, Seoul (KR)

(73) Assignees: SAS Technologies Co., Ltd., Seoul (KR); Industry-University Cooperation Foundation Hanyang University, Seoul (KR)

( * ) Notice: Subject to any disclaimer, the term of this patent is extended or adjusted under 35 U.S.C. 154(b) by 20 days.

(21) Appl. No.: 12/399,676

(22) Filed: Mar. 6, 2009

(65) Prior Publication Data

US 2009/0225813 A1 Sep. 10, 2009

Related U.S. Application Data

(63) Continuation-in-part of application No. 10/814,286, filed on Apr. 1, 2004, now Pat. No. 7,522,654, which is a continuation of application No. PCT/KR02/01945, filed on Oct. 18, 2002.

(30) Foreign Application Priority Data

Oct. 18, 2001 (KR) ............... 10-2001-0064498

(51) Int. Cl.
*H04L 1/02* (2006.01)

(52) U.S. Cl. .................... 375/267; 375/347

(58) Field of Classification Search ............. 375/144, 375/146, 148, 267, 347
See application file for complete search history.

(56) References Cited

U.S. PATENT DOCUMENTS

| 6,085,104 | A | * | 7/2000 | Kowalski et al. | 455/506 |
| 6,529,545 | B2 | * | 3/2003 | Tiirola et al. | 375/148 |
| 2001/0022808 | A1 | * | 9/2001 | Komatsu | 375/148 |
| 2002/0044616 | A1 | * | 4/2002 | Sim | 375/347 |
| 2002/0128027 | A1 | * | 9/2002 | Wong et al. | 455/513 |
| 2003/0021236 | A1 | * | 1/2003 | Kenney et al. | 370/250 |
| 2004/0202228 | A1 | * | 10/2004 | Kaewell et al. | 375/144 |
| 2008/0310484 | A1 | * | 12/2008 | Shattil | 375/146 |

* cited by examiner

*Primary Examiner*—Emmanuel Bayard
(74) *Attorney, Agent, or Firm*—Mannava & Kang, P.C.

(57) ABSTRACT

Disclosed is a weight vector computing unit using a symbol-rate, a chip-rate and/or a mixed-rate in a Smart Antenna System. The weight vector computing unit is useful in a wireless communication network having a reverse pilot channel. Further, by using such the weight vector computing unit, high-speed broadband communications are available in a smart antenna system. In such 3-G wireless communications where both traffic signals and pilot signals are transmitted from a terminal, the weight vector computing unit calculates optimized weight vectors using the pilot signal and the calculated weight vectors are adapted to each traffic signal. The weight vector computing unit is configured to receive the received signal and/or the integrated signal in order to produce a weight vector for beamforming without any training signal.

16 Claims, 17 Drawing Sheets

WEIGHT VECTOR CALCULATION UNIT FOR BEAMFORMING USING RECEIVED AND/OR INTEGRATED SIGNAL WITHOUT TRAINING SIGNAL

PRIORITY

This application is a continuation-in-part and claims the benefit of the filing date of U.S. patent application Ser. No. 10/814,286, filed on Apr. 1, 2004, now U.S. Pat. No. 7,522,654 which is a continuation of International Patent Application No. PCT/KR02/01945, filed on Oct. 18, 2002, the disclosures of which are incorporated herein by reference in their entireties.

BACKGROUND OF THE INVENTION

1. Technical Field

This disclosure relates to a beamformer for providing a weight vector to a received signal in mobile communication environments, e.g., Code Division Multiple Access (CDMA), Wideband Code Division Multiple Access (WCDMA), Orthogonal Frequency Division Multiple Access (OFDMA) and WiMAX or WiBro mobile communications, etc. More specifically, this disclosure relates to a weight vector computing part having such a beamformer that is applicable to a smart antenna system, an apparatus and method for demodulating the received signal, and a computer-readable recording medium for recording a program that embodies the method.

2. Related Art

The importance of smart antenna system is widely recognized as a tool for efficiently increasing the capacity of mobile communication system. In general, it has been known that the smart antenna system enhances the performance of wireless communication system through a spatially selective reception, which causes the interfering signals to be reduced or solved.

In conventional cases, the weighting information needed in smart antenna system is obtained from a traffic channel in reverse link. The intrinsic characteristic of the traffic channel that the integration interval for despreading procedure cannot be taken long enough, however, the information cannot help being deteriorated.

In order to solve this problem, there was a Korean Patent No. 239177 registered on Oct. 19, 1999 entitled, "Receiving Apparatus and Method of Smart Antenna using Pilot Signals in CDMA Mobile Telecommunication System". In the Korean patent 239177, the signal from each antenna element is multiplied by an adaptive weight and combined to produce array output. The output is despreaded with the PN code and properly filtered. In order to produce a reference signal, however, the filtered signal is multiplied again by the same PN code. The technique disclosed in the patent 239177 is based on an error signal produced from the difference between the array output and the reference signal. The adaptive procedure produces the weights to be multiplied by the received signals from a plurality of antenna elements by minimizing the error signal by means of well-known technique, LMS (least mean square) algorithm.

The problem in this method, however, is in executing the LMS algorithm which essentially needs the reference signal for producing the difference to be minimized at each adaptation step. In fact, the procedure of multiplying the PN code to the despreaded received signal is needed only to produce the reference signal. It is absolutely irrelevant to the reception or demodulation procedure itself. The procedure of producing the reference signal must cause additional delays and errors as well as the complexity due to PN code multiplication.

As another technique, there is a Korean patent application 1999-28020 which has been published on Feb. 5, 2001, entitled "CDMA Signal Demodulator for an adaptive smart antenna system". In this disclosure, CDMA signal demodulator in the adaptive smart antenna system consists of a searcher bank for PN code acquisition, a finger bank which produces accurate timing information, a correlator bank which produces the despreaded data, a beamforming parameter computer which produces the weights to be multiplied to received signal, a beam-forming multiplier which produces the array output by multiplying the weights to the received signal, and a multipath combiner which aligns the despreaded data in time domain.

The problem in this technique is that it does not provide how each block (or, equivalently, bank) co-operates and interfaces to each other. One practical phenomenon caused by that defect is the initial PN code acquisition cannot be achieved. In order for the smart antenna system shown in the Korean patent application 1999-28020 to work as properly as claimed, it should be assumed that all the timing information needed at each block must be provided externally, which is not true in real situations. For example, both initial PN code acquisition and multipath searching should somehow be achieved apriori at the beginning stage, which is never realistic in practical situations, for the correlator bank to work properly. More specifically, the technique disclosed in the Korean patent application 1999-28020 fails to provide how the timing information is provided from the searcher bank to the correlator bank and the beamforming parameter computer such that the correlation for despreading the received signal and computing the weights at a proper time cannot be achieved. Also, without specifying the detailed method of PN code acquisition, multipath combining, which is essential in CDMA receiver, can never be achieved as well.

Therefore, the system shown in the Korean patent application 1999-28020 must start with inaccurate timing information at the beginning stage, which results in extremely adverse reliability. In addition, inaccurate timing information results in tremendously slow convergence in adapting the weights even if it can converge. Mostly, it does not converge at all.

Another technique is disclosed in a Korean patent application 1999-30463 published on Feb. 15, 2001, entitled "Smart Antenna System having a beam-former and an adaptive equalization combiner for multipath signals". The main part of this technique is that a beamforming can be achieved through an adaptive beamforming algorithm instead of selection diversity through the searcher bank.

In this technique as well as in the previous ones, there is no explanation about how the timing information is obtained. More specifically, it is assumed in this technique that the searching is perfectly obtained apriori at the beginning stage, i.e., stage before the despreading procedure for the chip-level weighting, which is never true in real situations. As in the previous case, i.e., 1999-28020, the inaccurate timing information due to the lack of specified searching technique must cause very slow converge in the adaptation of weights even if the procedure does not diverge. The slow convergence leads to a serious degradation in performance of smart antenna system.

In addition, this technique fails to disclose for any normal people with common knowledge to understand how the adaptive beamforming algorithm searches for the weights.

SUMMARY

This disclosure has been proposed to solve the problems in the conventional techniques discussed above. The objective of this disclosure is to provide a weight vector calculation unit, i.e., beamformer, for a smart antenna system capable of tracking each user and provide a high speed wide-band communication using the weights computed from pilot channel signal in the reverse link without a reference or training signal.

This disclosure also provides a demodulation apparatus and method of a smart antenna system using a weight vector calculation unit operating in a symbol-rate weighting, a chip-rate weighting or a mixed-rate weighting thereof for tracking each user and achieving high speed wide-band communication by weighting the received data carried in traffic channels with the weights computed from pilot channel signal in the reverse link.

Those who are skilled in the art of the present invention will easily recognize another purposes and advantages of the invention from the drawings, detailed description of the invention, and claims.

In one embodiment, there is provided a telecommunication system having an array antenna system, wherein the array antenna system has a plurality of antenna elements for beamforming to each user, the telecommunication system including an integration unit configured to produce an integrated signal by integrating a received signal from the antenna element and a weight vector computing unit configured to receive the received signal and/or the integrated signal in order to produce a weight vector for beamforming.

In one embodiment, there is provided a weight vector computing unit including an algorithm executing unit configured to compute a weight vector using input signals, wherein the input signal consists of a received signal from an antenna element and an integrated signal and an integration unit configured to produce the integrated signal by integrating the received signal from the antenna element.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION

Objectives, characteristics, and merits of this disclosure described above will be more clarified through explanations given in this section. In explaining this disclosure, details of conventional techniques that are used in common with this disclosure have been excluded in this disclosure because, otherwise, it may confuse originalities disclosed only in this disclosure. In this disclosure, a pilot signal is used to produce weight vectors for beamforming in an array antenna system and a reference signal, which has been employed in the Least Mean Square algorithm, is not used. The pilot signal can be classified into an x-vector pilot signal and a y-vector pilot signal. The x-vector pilot signal can be obtained before integrating a received pilot signal from an antenna system and the y-vector pilot signal can be obtained after integrating the received pilot signal even if they are processed by different functional blocks in each mobile communication environment.

Figure 1:
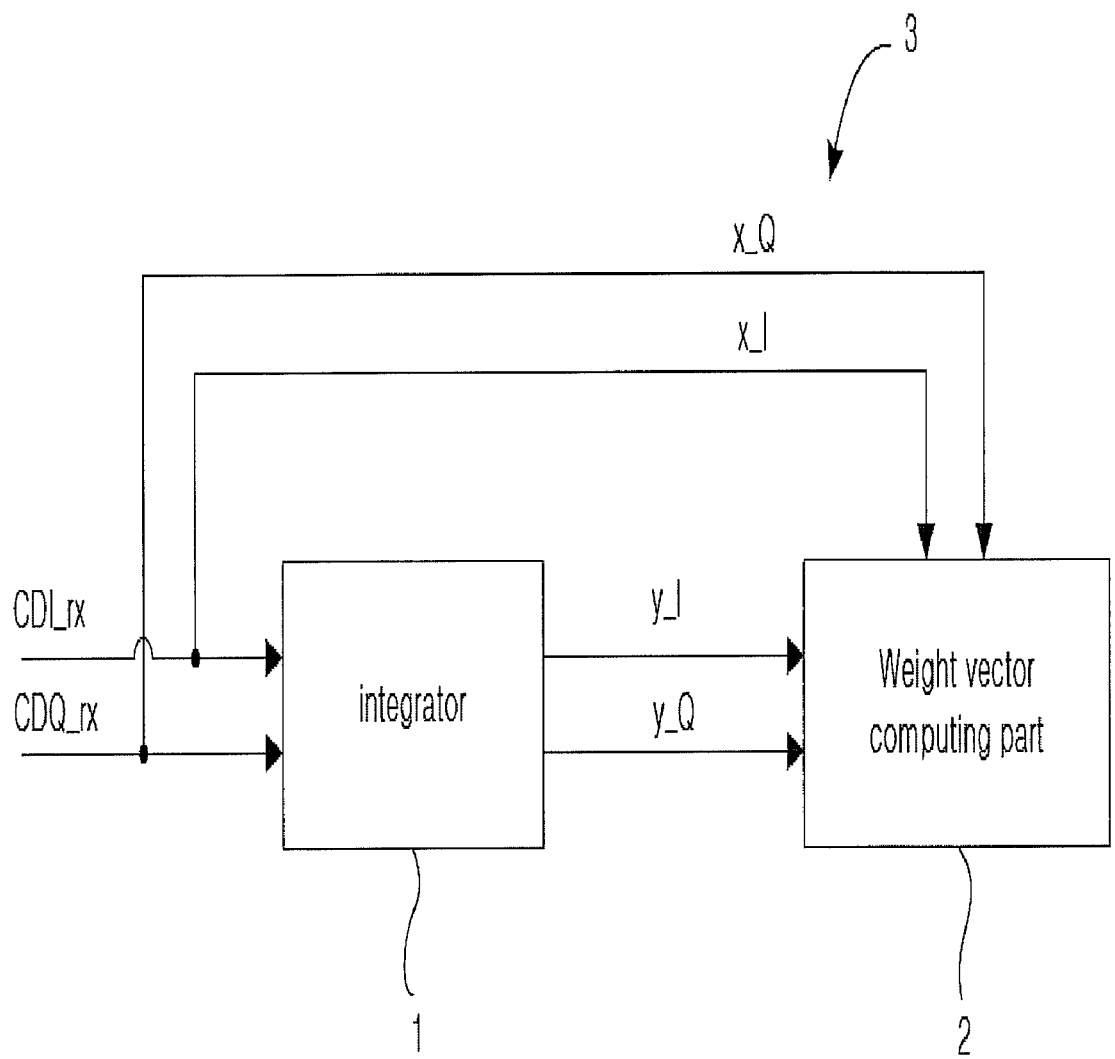
FIG. 1 is a schematic diagram illustrating a weight vector calculation unit using x- and y-vector signals according to one embodiment.

FIG. 1 is a schematic diagram illustrating the x- and y-vector pilot signals which are used for calculating a weight vector. Referring to FIG. 1, a received signal CDI_rx and CDQ_rx is integrated by an integrator 1. The integrator 1 can be defined variously based on an applicable communication system. For example, the integrator 1 can be a FFT in an OFDMA-based communication system. y-vector signal y_I and y_Q is a signal which is produced by integrating the received signal CDI_rx and CDQ_rx. For convenience in illustration, the received signal CDI_rx and CDQ_rx can be referred to as an x-vector signal (not integrated signal) for the y-vector signal y_I and y_Q. Both the integrated signal (y-vector signal: y-I and y_Q) and the x-vector signal x-I and x_Q can be processed by a weight vector computing part 2 or one of them be processed. In contrast to the LMS (least mean square) algorithm in the prior art, it should be noted that the weight vector computing part 2 uses the x- and y-vector signals, but not a reference (or training) signal, in calculating weight vector for beamforming. More detailed block diagrams and operations according to the present invention will be described based on the CDMA2000 communication system below. The weight vector computing part 2 can be implemented by various algorithm executing units which use the x-vector signal x_I and x_Q and the y-vector signal y_I and y_Q without any training signals. The use of the y-vector signal y_I and y_Q contributes to obtaining the weight vector which is capable of maximizing SNR (Signal to Noise Ratio) of the received signal from the array antenna. Furthermore, in addition to the y-vector signal y_I and y_Q, the use of the x-vector signal x_I and x_Q further contributes to obtaining the weight vector, which is capable of maximizing SINR (Signal to Interference plus noise Ratio) of the received signal from the array antenna, with the removal of an interference (or null) signal.

Figure 2:
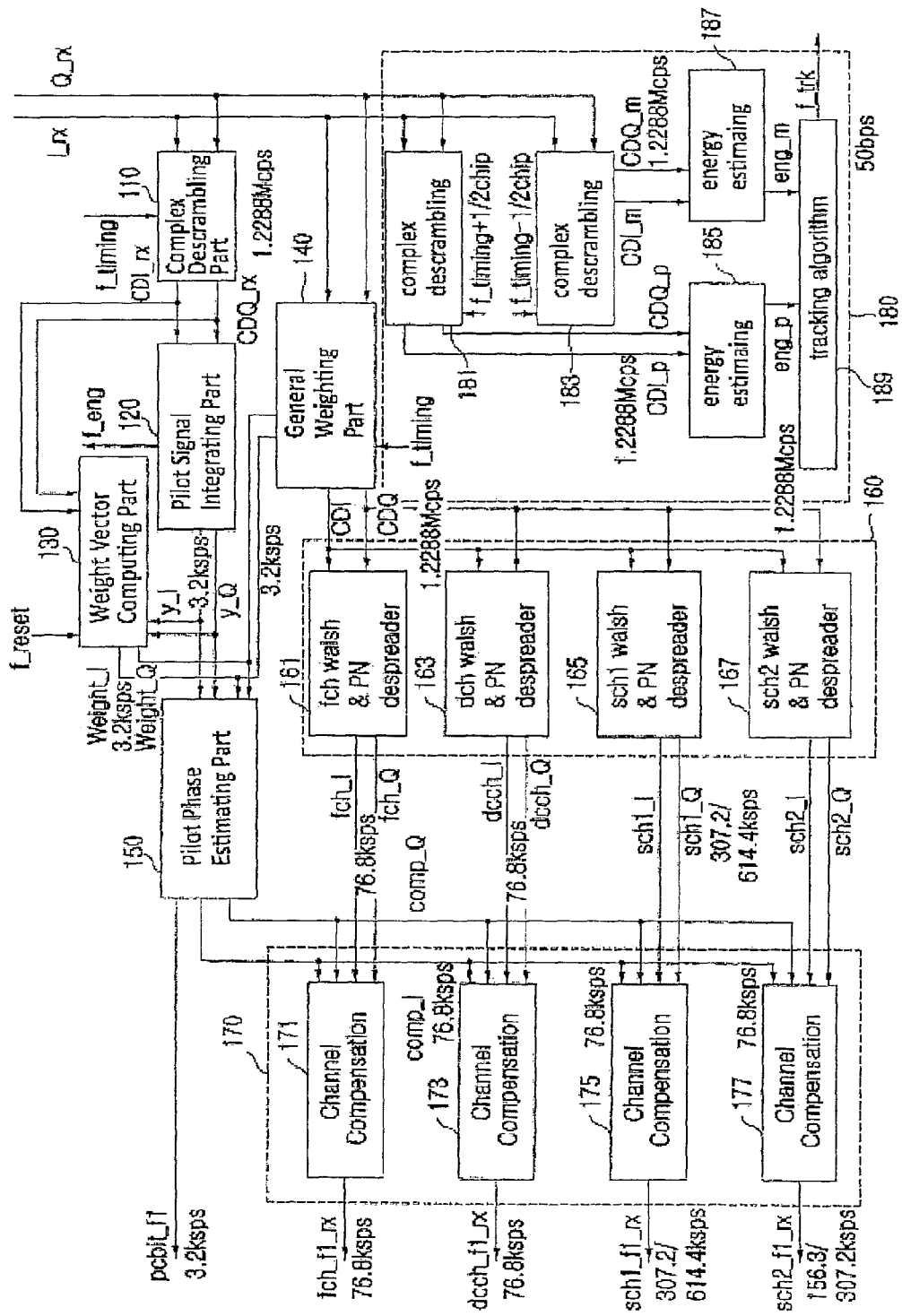
FIG. 2 is a block diagram illustrating an example of a CDMA2000 receiver having the weight vector calculation unit of FIG. 1.

First, FIG. 2 is a block diagram illustrating an example of a CDMA2000 finger using the x- and y-vector signals in a mixed-rate according to the present invention. In FIG. 2, the reference numerals 110, 120, 130, 140, 150, 160, 170, and 180 denote a descrambling part, a pilot signal integrating part, a weight vector computing part, a general weighting part, a pilot phase estimating part, a Walsh despreading part, a channel compensating part, and a tracking part, respectively.

Referring to FIG. 2, this descrambling part 110 descrambles received in-phase and quadrature-phase signal I_rx and Q_rx by multiplying a PN code with the received in-phase and quadrature-phase signal I_rx and Q_rx in a digital state (which means received signal transformed into baseband from each antenna element and hereinafter, will be referred to as "received signal") using the frame timing information provided from an outside of the finger, thereby forming a descrambled signal CDI_rx and CDQ_rx. The pilot signal integrating part 120 retrieves a pilot signal y_I and y_Q from the descrambled signal CDI_rx and CDQ_rx to be used as input of the weight vector computing part 130 by integrating output of the descrambling part 110 and estimates a phase delay of channel and power of the pilot signal. The weight vector (beamforming parameter) computing part 130 computes a weight vector Weight_I and Weight_Q by using both the descrambled signal CDI_rx and CDQ_rx from the descrambling part 110 and the pilot signal y_I and y_Q from the pilot signal integrating part 120. The general weighting part 140 produces an array output CDI and CDQ by multiplying the received signal I_rx and Q_rx with the weight vector and summing up the results of the multiplications in such a way that an inter-element phase difference between antenna elements is compensated in a chip-rate. The pilot phase estimating part 150 produces a phase compensation signal comp_I and comp_Q to compensate the phase delay of channel by multiplying the weight vector Weight_I and Weight_Q from the weight vector computing part 130 with the pilot signal y_I and y_Q in a symbol-rate. As mentioned above, in this disclosure, while both the general weighting part 140 operating in the chip-rate and the pilot phase estimating part 150 operating in the symbol-rate are used simultaneously in a mixed-rate, it is possible to selectively apply one of them to the finger.

In addition, the Walsh despreading part 160 separates the array output CDI and CDQ into traffic channel signals by multiplying a PN code to the array output CDI and CDQ from the general weighting part 140 and respectively multiplying the results with the Walsh codes assigned at the traffic channels. The channel compensation part 170 compensates each of the outputs from the Walsh despreading part 160 for phase distortion caused by the phase delay, by using outputs from the pilot phase estimating part 150. Furthermore, in this disclosure, the tracking part 180, which generates frame tracking information f_trk in order to compensate for a small change in a path delay, is provided within the finger operating such that a fine-tuning of tracking can be achieved in a given finger.

The weight vector computing part 130 provides the beamforming parameter, i.e., the weight vector, by processing the received signal in accordance with a preset arithmetic procedure. The weight vector is complex-valued vector of which real and imaginary part will be denoted in this disclosure as Weight_I and Weight_Q, respectively. A finger death signal f_death is generated in a lock detector in conjunction with a searcher when a PN code acquisition at a given finger is lost. For re-locking of the PN code acquisition, a finger reset signal f_reset is generated by the lock detector and the weight vector computing part 130 is in turn reset such that the weight vector computing part 130 starts the calculation.

When the pilot signal is multiplied by the weight vector, it is desirable to weight the pilot signal through calculation of phase delay, which is delay between a reference antenna and each antenna element.

As mentioned earlier, it is extremely important to provide exact timing information, i.e., synchronization information between the received signal I_rx and Q_rx and the local PN code, for accurate demodulation of CDMA data. Therefore, the tracking part 180 generates frame tracking information f_trk by observing energy difference between early and late descrambled signals CDI_m, CDQ_m, CDI_p and CDQ_P. The difference in time lag of early and late correlation is predetermined with a proper amount.

In the tracking part 180, it is desirable that first synch time information is to be 0.2 or 0.5 chip duration earlier than frame timing f_timing while second synch time information is to be 0.2 or 0.5 chip later.

In the tracking part 180, the timing information is produced from the difference between two energies eng_m and eng_p which are obtained by integrating the results of the early and late descrambling procedures in which the first and second synch time information are used, respectively. Or, in the tracking part 180, the energies corresponding to early and late descrambling procedures can also be generated by squaring weighted sums which is obtained by weighting sums of the integration signal of the descrambled signals obtained through the early and late descrambling procedures, respectively, with a weight vector. Another method in the tracking part 180 is that the energies corresponding to early and late descrambling procedures can also be generated by squaring the integration signal of weighted sums obtained by weighting the descrambled signals, which are output by the early and late descrambling procedures, respectively, with a weight vector.

For obtaining the frame tracking information f_trk in the tracking part 180, it may also be required to additionally compute the energy difference between early and late correlations such as low pass filtering of the energy difference.

In a desirable example of this disclosure, DLL (Digital Lock Loop) has been adopted at each the finger for fine-tracking to countermeasure the small changes in path delay during the communication. Through many computer simulations, it has been found that the frame timing f_timing is to be changed by ⅓-⅛ chip earlier or later than current value.

For easy explanation of techniques disclosed by this disclosure, we take demodulation apparatus of CDMA2000 1X as an example of applying the finger.

Figure 3A:
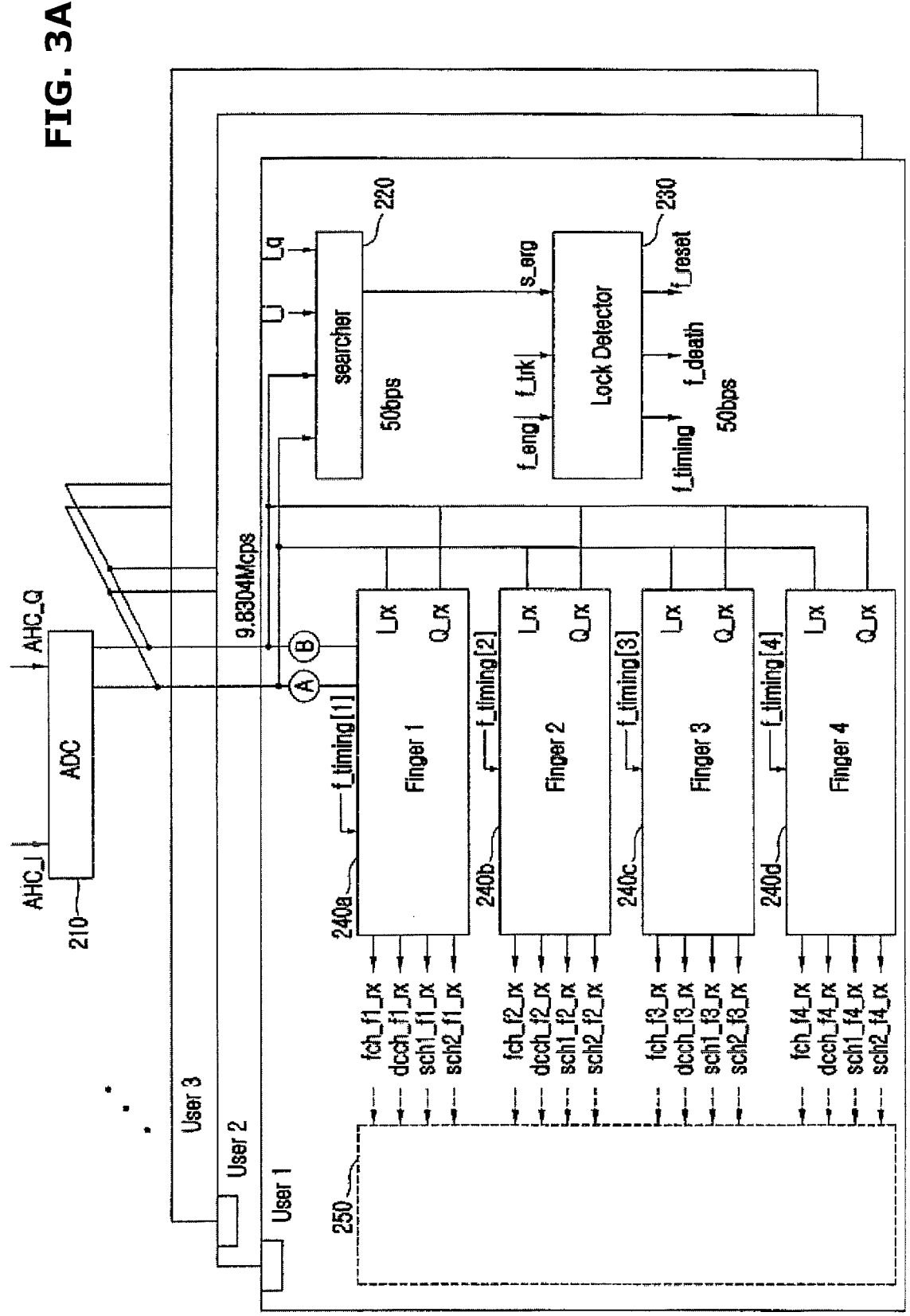
FIG. 3A illustrates one example of a block diagram of a demodulation apparatus, according to the present invention, that is equipped with the fingers shown in FIG. 2.
Figure 3B:
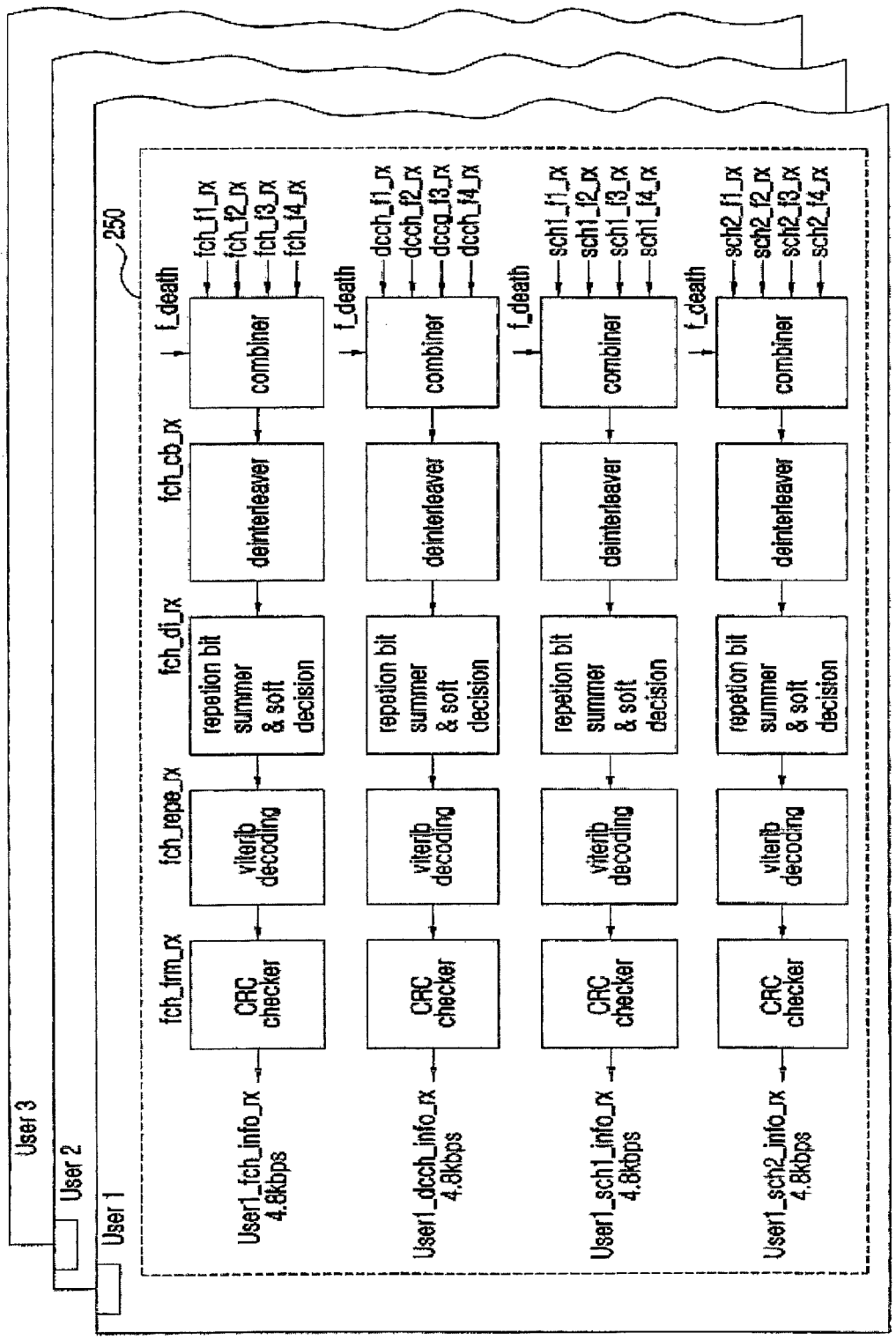
FIG. 3B illustrates one example of a received signal processing part in FIG. 3A.

Referring again to FIG. 2 that shows one desirable example of the finger structure, the descrambling part 110 performs complex descrambling of the received signal of which In-phase and Quadrature-phase components (I_rx and Q_rx) have been respectively scrambled with the corresponding PN code by correlating it with the PN code using the frame timing f_timing provided from a lock detector shown in FIG. 3A.

The pilot signal integrating part 120 retrieves the pilot signal in order to estimate a phase delay of the each traffic channel by integrating the descrambled signal CDI_rx and CDQ_rx and to be fed into the weight vector computing part 130. Output signals of the pilot signal integrating part 120 and the descrambling part 110 will be denoted as y-vector signal y_I and y_Q and x-vector signal x_I and x_Q, respectively, in this disclosure. The y-vector signal y_I and y_Q is obtained by integrating the x-vector signal x_I and x_Q. Depending on the arithmetic procedure of computing the weight vector in the weight vector computing part, only one of the x- and y-vector signals (x_I and x_Q, y_I and y_Q) can be used instead of both of them. Furthermore, the descrambling part 110 and the pilot signal integrating part 120 might also be unified as a single part such that the two operations can be achieved in the single part.

The weight vector computing part 130 produces the weight vector Weight_I and Weight_Q using the x-vector signal x_I and x_Q and the y-vector signal y_I and y_Q provided from the descrambling part 110 and pilot signal integrating part 120, respectively. In addition, the weight vector computing part 130 can also include a weight vector initializing part as well. Furthermore, the weight vector computing part 130 can also be equipped with an additional part to receive the frame reset signal f_reset from the lock detector (in FIG. 3A) in order to reset the weight vector Weight_I and Weight_Q into an initial state. Also, depending on the arithmetic procedure to compute the weight vector in the weight vector computing part, only one of the x- and y-vector signals (x_I and x_Q, y_I and y_Q) can be used.

The general weighting part 140 generates the array output CDI and CDQ in the chip-rate by multiplying the received signal I_rx and Q_rx by the weight vector Weight_I and Weight_Q and summing up the results of the multiplications in such a way that the inter-element phase difference between antenna elements is compensated for.

The pilot phase estimating part 150 retrieves the pilot signal that is to be used to compensate for the phase distortion, which caused by the path delay, by multiplying the pilot signal from the weight vector computing part 130 with the weight vector Weight_I and Weight_Q from the general weighting part 140. The pilot phase estimating part 150 also detects power control bit and provides a frame energy signal f_eng to the lock detector (in FIG. 3A) such that current value of the frame energy is transmitted to the lock detector.

Furthermore, in a desirable example of this disclosure, the Walsh despreading part 160 can include: a fundamental channel (which will be referred to as "FCH" for simplicity) despreading part 161 for retrieving data transmitted through the FCH by descrambling the array output CDI and CDQ through multiplication of the array output with the PN code and further multiplying the result of the descrambling of the array output CDI and CDQ with the Walsh code corresponding to the FCH of length 16 chips such that symbol rate of resultant data is reduced by 1/16 chip-rate (76.8 kbps); a dedicated control channel (which will be referred to as DCCH for simplicity) despreading part 163 for retrieving data transmitted through DCCH by descrambling the array output CDI and CDQ through multiplication of the array output with the PN code and further multiplying the result of the descrambling of the array output CDI and CDQ with the Walsh code corresponding to the DCCH of length 16 chips such that symbol rate of resultant data is reduced by 1/16 chip-rate (76.8 kbps); a first supplemental channel (which will be referred to as SCH1 for simplicity) despreading part 165 for retrieving data transmitted through SCH1 by descrambling the array output CDI and CDQ through multiplication of the array output with the PN code and further multiplying the result of the descrambling of the array output CDI and CDQ with the Walsh code corresponding to the SCH1 of length 16, 8, 4, or 2 chips such that symbol rate of resultant data is reduced by 1/16, 1/8, 1/4, or 1/2 chip-rate (76.8 kbps, 153.6 ksps, 307.2 ksps, or 614.4 ksps); and a second supplemental channel (which will be referred to as SCH2 for simplicity) despreading part 167 for retrieving data transmitted through SCH2 by descrambling the array output CDI and CDQ through multiplication of the array output with the PN code and further multiplying the result of the descrambling of the array output CDI and CDQ with the Walsh code corresponding to SCH2 of length 16, 8, 4, or 2 chips such that symbol rate of resultant data is reduced by 1/16, 1/8, 1/4, or 1/2 chip-rate (76.8 kbps, 153.6 ksps, 307.2 ksps, or 614.4 ksps). In the Walsh despreading part 160, the procedure of the descrambling and that of correlating with corresponding Walsh code can be performed in a single procedure using multiplication of the Walsh code and PN code on a chip-by-chip basis.

The channel compensating part 170 compensates for the phase distortion due to the path delay associated with each of traffic channels separately such that the channel compensating part 170 consists of plural the channel compensating parts. For example, there are four channel compensating parts 171, 173, 175, and 177 in case of CDMA2000 1X system.

The tracking part 180, which provides exact chip synchronization through the fine-tuning of PN code acquisition, comprises the following parts: a first complex descrambling part 181 for multiplying the received signal I_rx and Q_rx with the PN code at a timing which is 1/2 chip faster than the frame timing f_timing (this descrambling part will be denoted as "early descrambling part" in this disclosure); a second complex descrambling part 183 for multiplying the received signal I_rx and Q_rx with the PN code at a timing which is 1/2 chip later than the frame timing f_timing (this descrambling part will be denoted as "late descrambling part" in this disclosure); first and second energy estimation parts 185 and 187 for providing the correlation energies by integrating the results of the first and second complex descrambling parts 181 and 183, respectively; and a tracking information generating part 189 for providing the frame tracking information f_trk by comparing magnitudes of the results of the first and second energy estimation parts 185 and 187). In the early and late descrambling parts 181 and 183, the advanced and retarded time to the frame timing f_timing, can be some other values than 1/2, respectively. In general, it has been found that early and late time can be selected in range of 0.2 to 0.5 chip.

The first and second energy estimation parts 185 and 187 are needed for the fine-tuning of chip synchronization of the local PN code and the received signal I_rx and Q_rx. Integration value of energy level between the received signal I_rx and Q_rx and the local PN code has a maximum value in case of the perfect chip synchronization.

In the tracking information generating part 189, the frame tracking information f_trk is obtained by comparing the integration values provided from the first and second correlation energy generating parts 185 and 187) which are associated with the early and late descrambling parts 181 and 183, respectively. A voltage controlled oscillator (VCO) can be used to produce the frame tracking information f_trk.

As described above in detail, the finger of CDMA receiver with a main emphasis on the application to the smart antenna system makes it possible to track each user and provide high speed wide-band communication by weighting received data carried in the traffic channels in a chip-rate with the weight vectors computed from the pilot channel in the reverse link.

Although there are four the fingers assigned for each user in the demodulation apparatus of the smart antenna system in a desirable example in this disclosure, it is clear to any normal people with common knowledge that the number of the fingers assigned to each user can be set to any proper number in a given circumstance.

FIG. 3A illustrates an example of applications of the finger in FIG. 2. It is clear that the finger disclosed in this disclosure can be applied to the demodulation apparatus operating in any other kinds of communication environments (such as WCDMA system instead of CDMA2000 1X system). The demodulation apparatus shown in FIG. 3A comprises an ADC (analog-to-digital converter) 210, a searcher 220, a lock detector 230, fingers 240a to 240d, and a received signal processing part 250.

As shown in FIG. 3A, the demodulation apparatus including the finger operating in mixed-rate comprises the ADC 210 configured to generate a digital signal from an analogue signal AHC_I and AHC_Q through the procedure of oversampling the received analogue signal AHC_I and AHC_Q after the frequency-down conversion and the searcher 220 configured to transmit the searcher-energy (or, equivalently, the correlation energy), that exceeds a predetermined threshold value, to the lock detector 230 while the searcher-energy is computed through correlation procedure between output of the ADC and the PN code corresponding to the pilot channel.

In addition, the demodulation apparatus applying the finger operating in a chip-rate also comprises the lock detector 230 configured to generate signals needed for accurate frame synchronization such as the frame reset f_reset, the frame timing f_timing, the frame death f_death using a correlation energy s_erg provided from the searcher 220. As described already in previous explanations of FIG. 2, the demodulation apparatus can include a plurality of the fingers 240a to 240d, each of which also comprises the descrambilng part 110, the pilot signal integrating part 120, the weight vector computing part 130, the general weighting part 140, the pilot phase estimating part 150, the Walsh despreading part 160, the channel compensating part 170, and the tracking part 180 (which is also denoted as "tracker" in this disclosure), and the received signal processing part 250 which performs conventional functions of receiving apparatus such as a signal combiner, a de-interleaver, a soft-decision performer, a Viterbi decoder, a CRC (cyclic redundancy code) checker, a turbo decoder, and/or other kinds of conventional signal receiving, estimating, and/or detecting parts.

As shown in FIG. 3C, the received signal processing part 250 includes the signal combiner for combining each of the traffic signals fed from the plurality of the fingers, the de-interleaver for rearranging the received data back to their original order, the soft decision performer for providing the soft decision of the de-interleaved data, the Viterbi decoder for decoding convolutionally encoded data, the CRC checker for detecting a frame error, etc, of which structure and functions are so conventional to the ordinary skilled in the art. Accordingly, the detailed explanations will be omitted in this disclosure.

Furthermore, technology that can be applied to appropriately enhance the performance of the searcher 220 without computing the weight vectors has already been published in Korean patent No. 726719 filed on Apr. 18, 2001.

The more detailed description will be illustrated referring the accompanying drawings.

Figure 4:
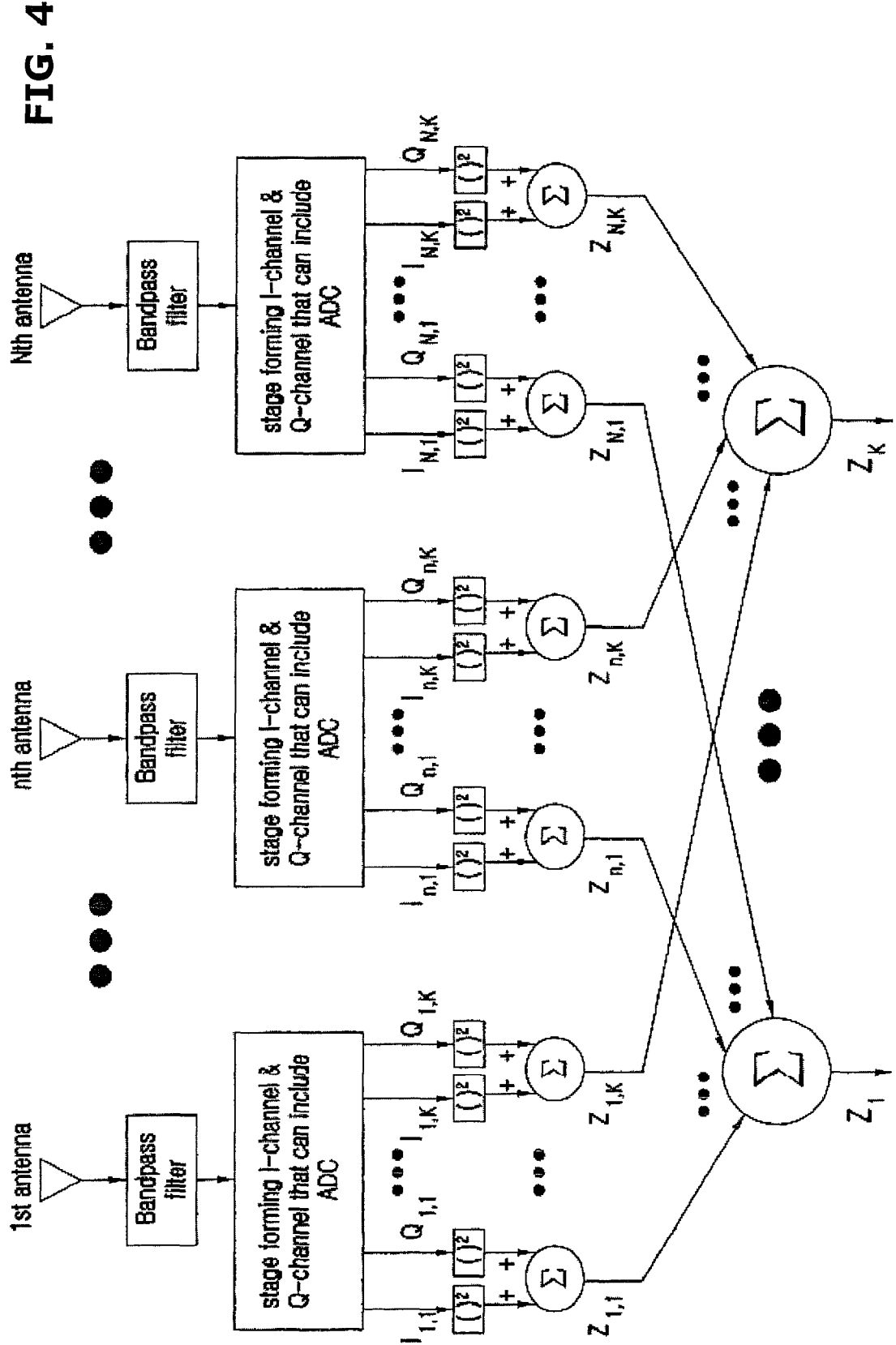
FIG. 4 illustrates concept of technology, which is referred to as "phase diversity technology", used in a searcher and a tracker in this disclosure.

FIG. 4 illustrates a conceptual block diagram for explaining concept of phase diversity technology that is applied to the searcher 220. For convenience in illustration, let's take an example from a demodulation procedure of the received data at n-th antenna element. The phase diversity, which has been applied to the finger in this disclosure, is explained in more detail referring to the accompanying drawings obtained through various computer simulations. Suppose there are M waves impinging upon the smart antenna system with distinct incident angles. This corresponds to the case of M users transmitting signals to the smart antenna system assuming no multipath. However, in a multipath environment, the number of users is a lot less than M. In either case, the phase difference between two antenna elements in the smart antenna system due to a signal propagated through a single path, i.e., l-th path, can be written as $\phi(\theta_l,d)$, a function of the incident angle $\theta_l$ and the element separation d. Therefore, $$\text{phase difference} = \phi(\theta_l, d) \quad \text{[Equation 1]}$$

Assuming that the l-th path carries a desired signal and the first antenna element is reference element, the desired and undesired part of I- and Q-components of the received signal at the k-th branch of the n-th antenna element, denoted by $I_{n,k}$ and $Q_{n,k}$, respectively, can be written as $$I_{n,k} = S_{l,k}\cos[\phi_l + (n-1)\varphi(\theta_l, d)] + \sum_{m=1, m\neq l}^{M} S_{m,k}\cos[\phi_m + (n-1)\varphi(\theta_m, d)] \quad \text{[Equation 2]}$$

$$Q_{n,k} = S_{l,k}\sin[\phi_l + (n-1)\varphi(\theta_l, d)] + \sum_{m=1, m\neq l}^{M} S_{m,k}\sin[\phi_m + (n-1)\varphi(\theta_m, d)] \quad \text{[Equation 3]}$$

where $\phi_m$ is a carrier phase delay associated with the m-th path, and $S_{m,k}$ is an amplitude of the received signal at the k-th branch of the reference antenna element propagated through the m-th path. Note that the first terms of equation (2) and (3) are the desired signals and the second terms are the interferences since the l-th path carries the desired signal. The noise terms are ignored for the sake of simplicity. If incident angles $\{\theta_m\}$ are assumed to be mutually independent random variables with uniform distribution, then, for sufficiently large M, the interfering terms, i.e., the second terms of equation (2) and (3), are mutually independent Gaussian random variables. Then, equation (2) and (3) can be rewritten as $$I_{n,k} = G[S_{l,k}\cos(\Theta_{n,l}), \sigma^2] \quad \text{[Equation 4]}$$

$$Q_{n,k} = G[S_{l,k}\sin(\Theta_{n,l}), \sigma^2] \quad \text{[Equation 5]}$$

where $G[\mu, \sigma^2]$ denotes a Gaussian random variable with mean $\mu$ and variance $\sigma^2$ where the variance is determined by the sum of the interferers' power measured at receiving side, and $\Theta_{n,l} = \phi_l + (n-1)\phi(\theta_l, d)$.

The correlation energy is obtained from squared sum of I- and Q-components for the non-coherent envelope detection. Denoting the correlation energy associated with the k-th branch by $Z_k$, it is claimed in the "Phase diversity technology"

(a patent in pending as of 20971 in Korea dated as on Apr. 18, 2001) that each of the correlation energy should be obtained from the sum of all the corresponding I- and Q-components obtained from each antenna element, i.e., $$Z_k = \sum_{n=1}^{N} [I_{n,k}^2 + Q_{n,k}^2] \text{ for } k = 1, 2, \ldots, K \quad \text{[Equation 6]}$$

Probability density function (PDF) of the correlation energy $Z_k$ can be written as $$p_{Z_k}(\alpha) = \frac{(\alpha/\sigma^2 b_k)^{(N-1)/2}}{2\sigma^2} e^{-\frac{1}{2}(b_k + \alpha/\sigma^2)} \text{ for } \alpha \geq 0 \quad \text{[Equation 7]}$$

$$I_{N-1}\left(\sqrt{\frac{b_k \alpha}{\sigma^2}}\right),$$

$$= 0, \quad \text{for } \alpha < 0$$

where the non-centrality parameter $$b_k = N\frac{S_k 2}{\sigma^2} \text{ and } I_{N-1}(\cdot)$$

is the modified Bessel function of the first kind with order N−1. Note that when $S_k=0$, $b_k$ becomes zero. This means that when the amplitude of the desired signal is zero at the k-th branch. Therefore, when there is no the desired signal at the k-th branch, the correlation energy $Z_k$ is a central chi-squared random variable. For this case, the PDF of the correlation energy $Z_k$ becomes, $$p_{Z_k}(\alpha) = \frac{1}{(\sigma^2)^N 2^N \Gamma(N)} \alpha^{(N-1)} e^{-\alpha/2\sigma^2} \quad \text{[Equation 8]}$$

where $\Gamma(\cdot)$ denotes Gamma function.

The mean of the central chi-square random variable is $2N\sigma^2$ and its variance is $4N\sigma^4$. For the case of non-central Chi-square, the mean is $N(2\sigma^2+S^2)$ and the variance is $4N\sigma^2(\sigma^2+S^2)$. Both the mean and variance of the correlation energy $Z_k$ increase linearly as the number of antenna elements increases. This indicates that performance of the non-coherent detection improves linearly as the number of antenna elements in the smart antenna system increases. Consequently, the phase diversity technique, through the correlation energy $Z_k$, increases the signal-to-interference ratio (SIR) by nearly N-times where N is the number of antenna elements in the smart antenna system. It is important that there is no the weight computation involved in achieving the phase diversity gain.

Figure 5:
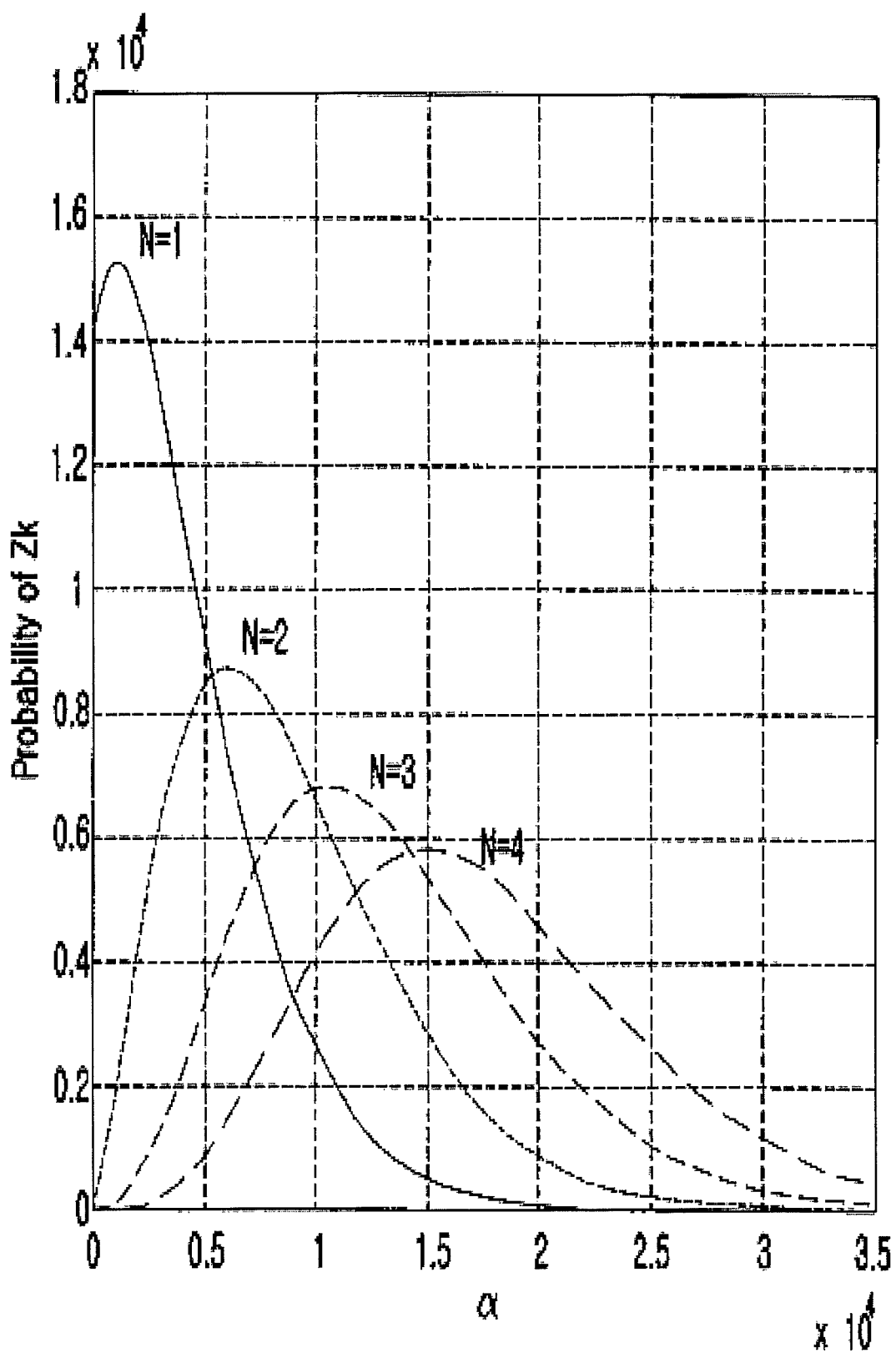
FIG. 5 illustrates performance of the phase diversity technology when $S_{l,k}=50$ and $\sigma^2=1000$. It can be observed that distribution of energy ($Z_{l,k}$) is more concentrated as number of antenna is increased.
Figure 6:
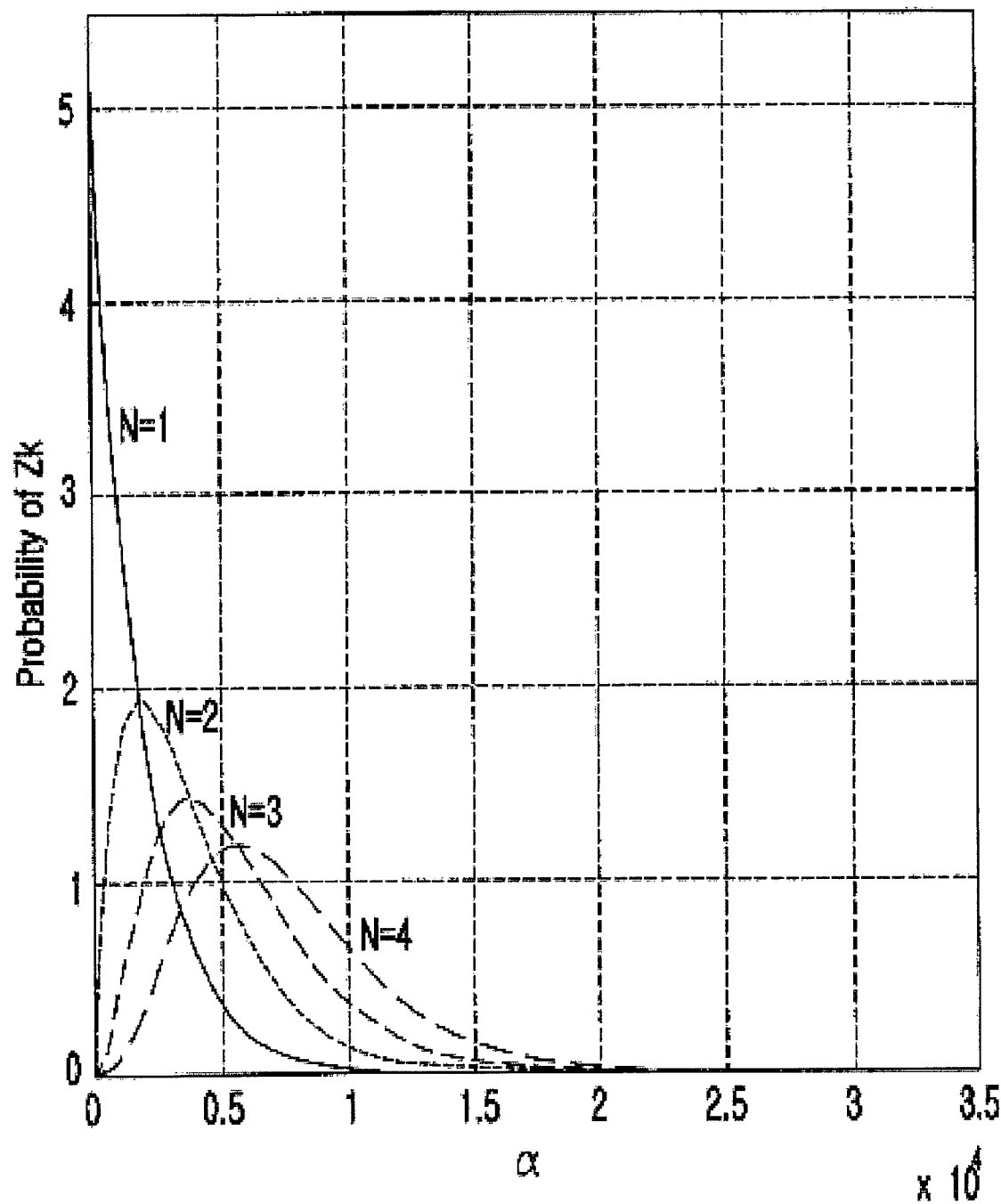
FIG. 6 illustrates performance of the phase diversity technology when $S_{l,k}=0$ (no desired signal) and $\sigma^2=1000$. It can be observed that distribution of energy ($Z_{l,k}$) is more concentrated as number of antenna is increased.
Figure 7:
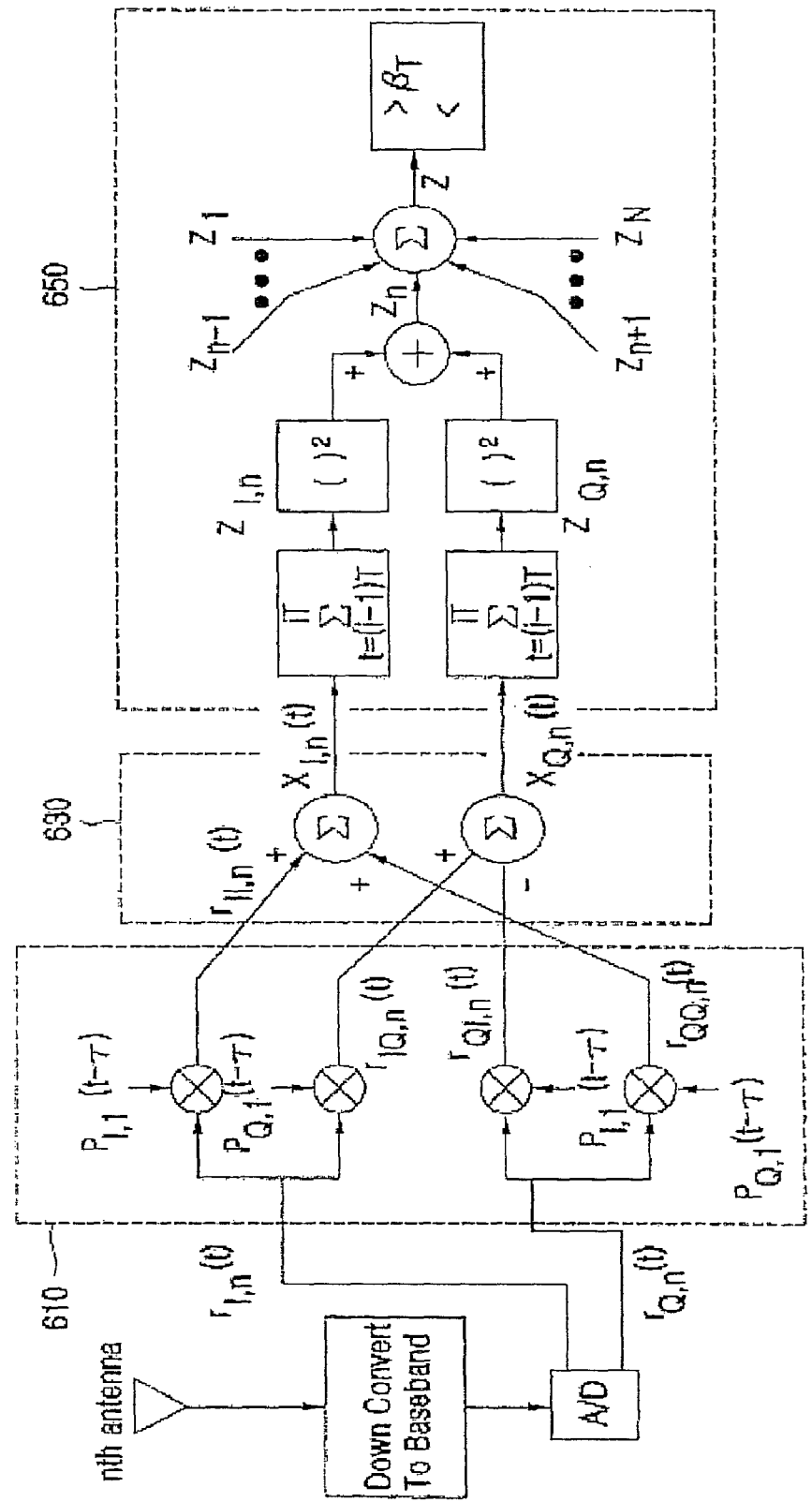
FIG. 7 illustrates an example of application of the phase diversity to the searcher operating in reverse link of a mobile communication system.

FIG. 5 and FIG. 6 show the probability distribution of correlation energy $Z_k$ as the number of antenna elements varies from 1 to 4. FIG. 4 shows the case of $S_k=50$, $\sigma^2=1000$, which means there exists the desired signal; whereas FIG. 5 shows the case of $S_k=0$, $\sigma^2=1000$, which means there is no the desired signal present. FIG. 6 illustrates a block diagram of the searcher applied in an example of CDMA system incorporating the phase diversity technique. In FIG. 7, $P_I(t-\tau)$ and $P_Q(t-\tau)$ denote the I- and Q-components, respectively, of the PN code corresponding to the desired signal impinging upon the smart antenna system through the l-th path. Objective of the PN code acquisition is to find the timing information, more specifically, value for time lag $\tau$ in $P_I(t-\tau)$ and $P_Q(t-\tau)$ which provides peak value in the correlation. As subscript k is deleted, the correlation energy Z can be rewritten as $$Z = \sum_{n=1}^{N} [I_n^2 + Q_n^2] \quad \text{[Equation 9]}$$

Considering following two hypotheses;
$H_1$: acquisition is achieved
$H_0$: acquisition is not achieved
then, conditional probabilities under these hypotheses are $$p_z(\alpha \mid H_0) = \frac{1}{(\sigma^2)^N 2^N \Gamma(N)} \alpha^{(N-1)} e^{-\alpha/2\sigma^2}, \quad \text{[Equation 10]}$$

$$p_z(\alpha \mid H_1) = \frac{(\alpha/\sigma^2 b)^{(N-1)/2}}{2\sigma^2} e^{-\frac{1}{2}(b+\alpha/\sigma^2)} I_{N-1}\left(\sqrt{\frac{b\alpha}{\sigma^2}}\right), \quad \text{[Equation 11]}$$

where $\sigma^2=2TM$ in (10), $\sigma^2=2T(M-1)$ in (11), and $b=2TM/(M-0.5)$ with T being the integration interval in computing the correlation energy. From equations 10 and 11, probabilities of detection and false alarm in a single synchronization test can respectively be given as $$P_F = Pr\{Z > \beta_T \mid H_0\} \text{ with } \sigma^2 = 2TM \quad \text{[Equation 12]}$$

$$= \int_{\beta_T}^{\infty} \frac{1}{(\sigma^2)^N 2^N \Gamma(N)} \alpha^{(N-1)} e^{-\alpha/2\sigma^2} d\alpha$$

$$P_D = Pr\{Z > \beta_T \mid H_1\} \text{ with } \sigma^2 = 2T(M-1) \quad \text{[Equation 13]}$$

$$= \int_{\beta_T}^{\infty} \frac{(\alpha/\sigma^2 b)^{(N-1)/2}}{2\sigma^2} e^{-\frac{1}{2}(b+\alpha/\sigma^2)}$$

$$I_{N-1}\left(\sqrt{\frac{b\alpha}{\sigma^2}}\right) d\alpha.$$

Figure 8:
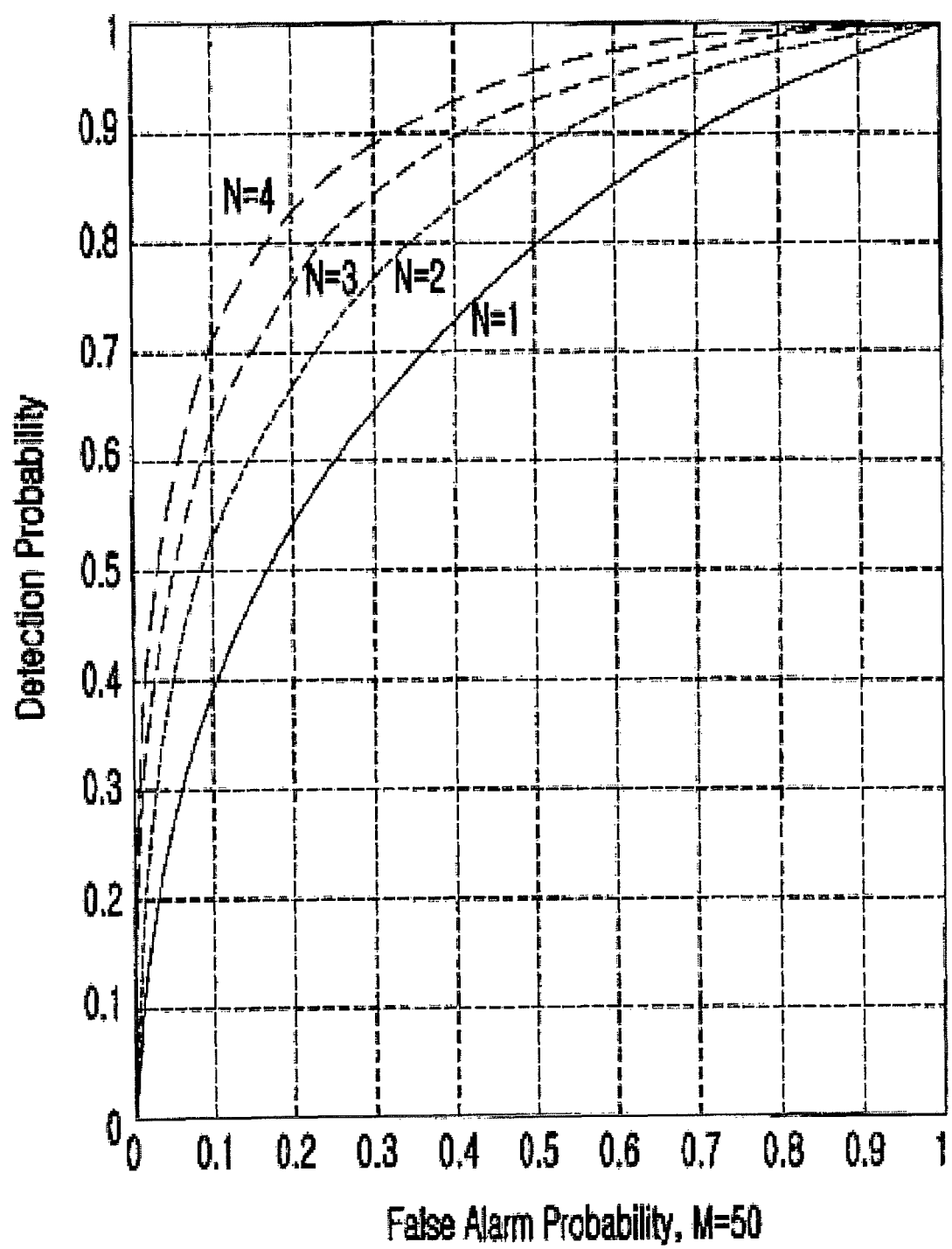
FIG. 8 illustrates theoretical performance of detection probability ($P_D$) and false alarm probability probability ($P_F$) when processing gain (PG), i.e., period for the pilot channel integration, is 64 and number of interferers is 50.
Figure 9:
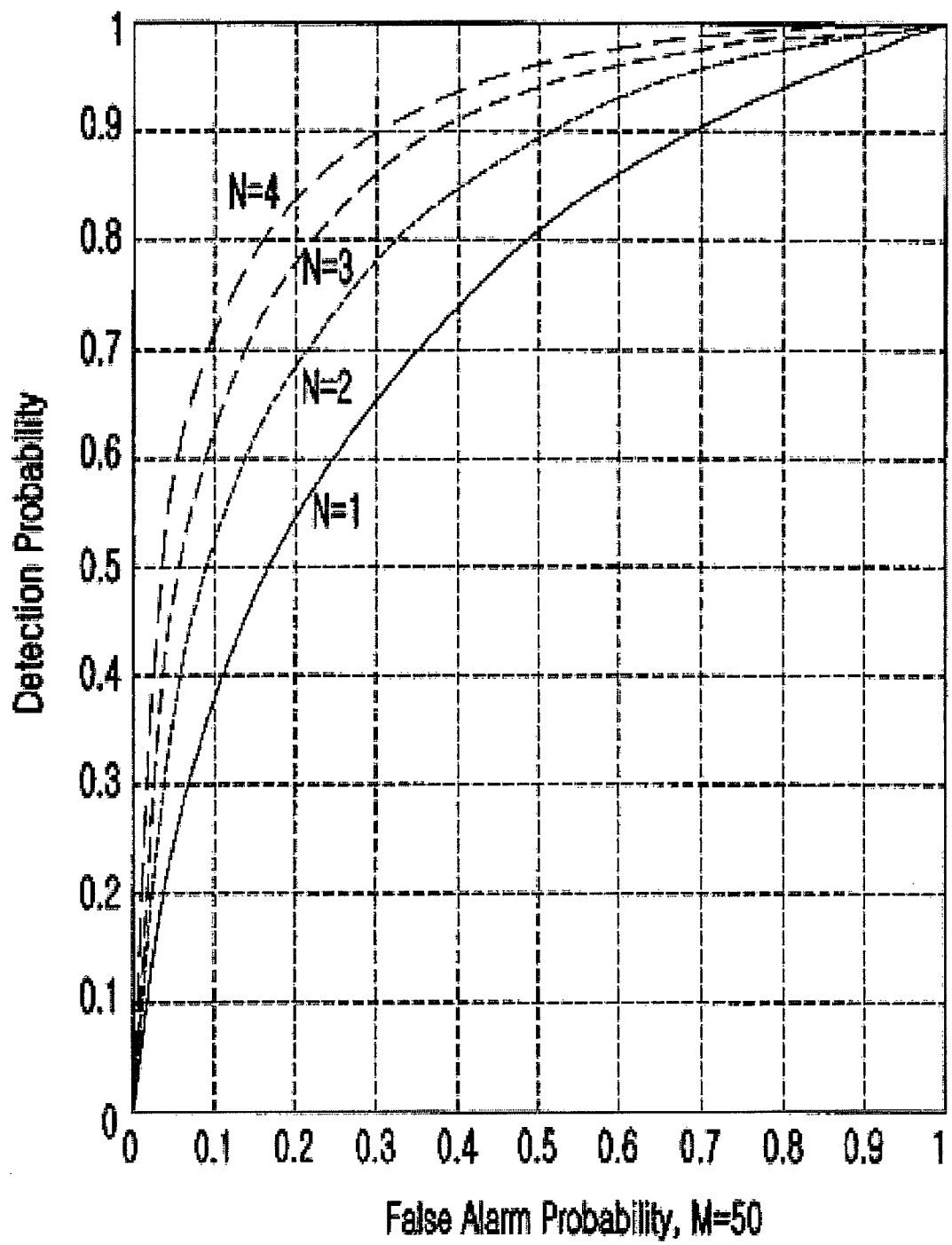
FIG. 9 illustrates simulation performance of detection probability and false alarm probability when processing gain (PG), i.e., period for the pilot channel integration, is 64 and number of interferers is 50.

Solving equation 12 and 13 for $\beta_T$, theoretical values for the detection probability and false alarm probability can be obtained. FIG. 8 shows the theoretical values of the detection and false alarm probabilities obtained from equation 12 and 13, and FIG. 9 shows corresponding results for real situation obtained from Monte Carlo simulation. In FIG. 8 and FIG. 9, the integration interval T has been set in such a way that the number of chips in the integration interval becomes 64. It means that processing gain of 64 has been exploited during the searching procedure. Number of the interferers has been set to be 50.

Figure 10:
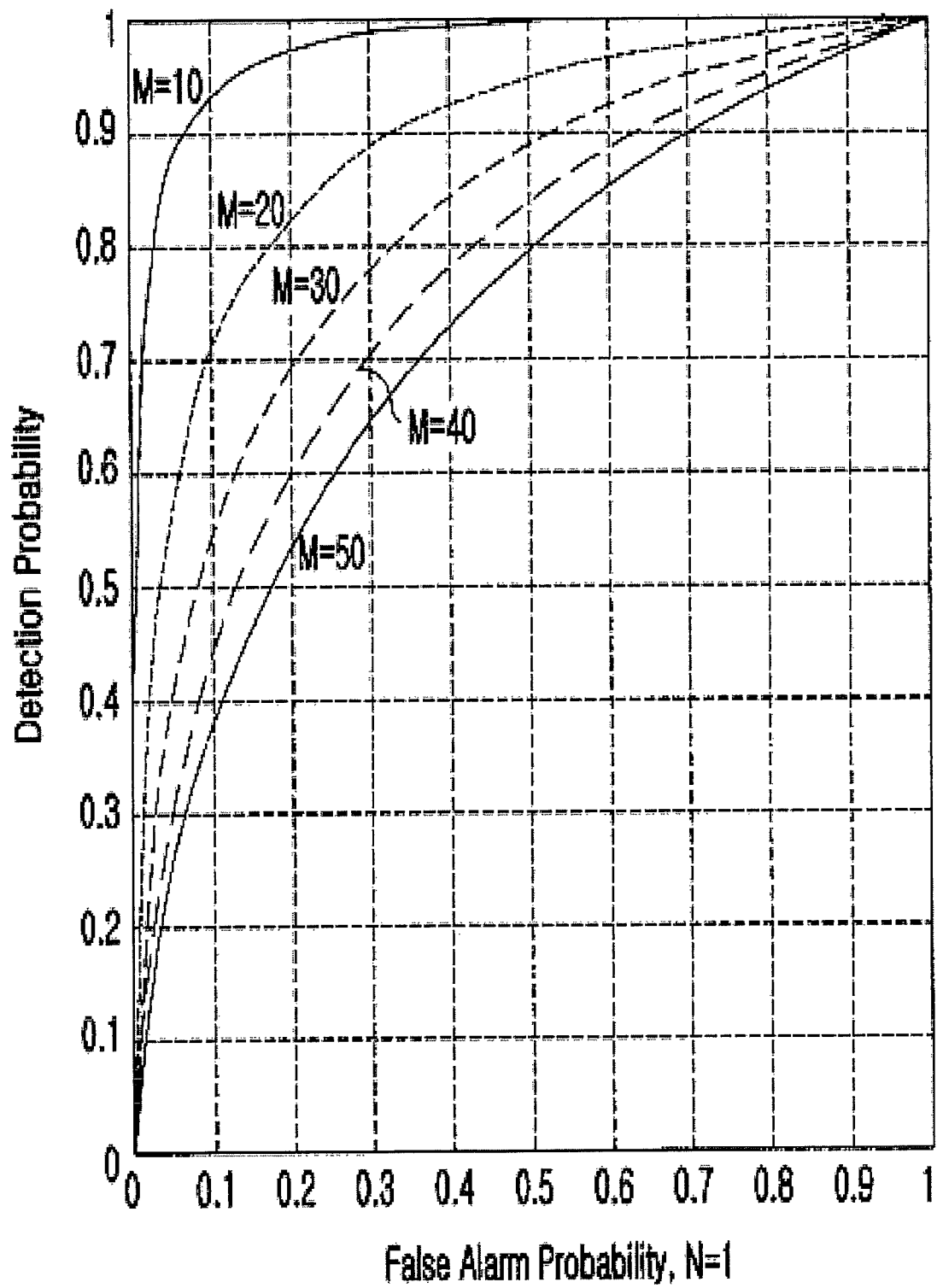
FIG. 10 illustrates theoretical values for $P_F$ and $P_D$ when number of antenna elements is one.
Figure 11:
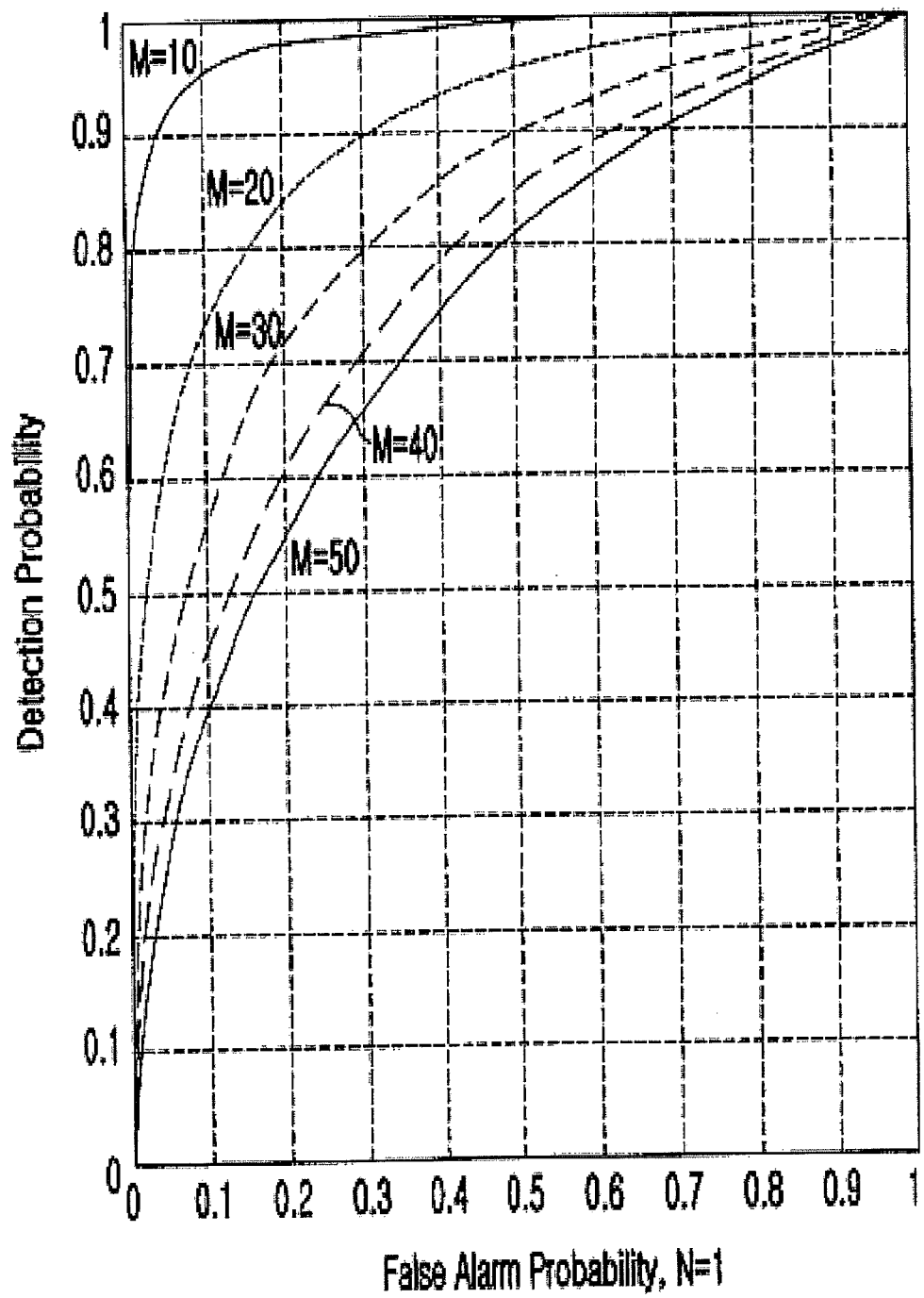
FIG. 11 illustrates simulation values for $P_F$ and $P_D$ when number of antenna elements is one.

FIGS. 10 and 11 show the detection probability and false alarm probability for a single antenna system as a function of number of the interferers. It is worthwhile to note that the performance of a searcher in a given CDMA receiver is drastically enhanced by the phase diversity technology. For instance, as shown in FIG. 9, the smart antenna system with 4 antenna elements incorporating the phase diversity technique can tolerate 50 of the interferers while conventional one-antenna system can tolerate only 20 of the interfering users to maintain comparable searching performance. This implies that communication capacity is increased by nearly 2.5 times for the PN code acquisition. This improvement is due to 4 dB gain in SIR through the phase diversity technique in the smart antenna system of 4 antenna elements.

The main contribution of the phase diversity technology is that the smart antenna system can be made to outperform normal one-antenna systems even from initial stage when the optimal weight vectors are not available.

The demodulation apparatus in the above-described structures and functions makes it possible in the smart antenna system that each user be tracked accurately and high speed wide-band communication be provided by weighting the received data carried in the traffic channels in a mixed-rate with the weight vectors computed from the pilot channel in the reverse link.

The demodulation apparatus disclosed is for each user's channel card. As an example, the channel card with four fingers at each user's channel card has been introduced in this disclosure. However, it is clear to those skilled in the art that the number of the fingers to be assigned at each user can be set with any proper selection depending on a given signal environment and/or convenience.

Figure 12:
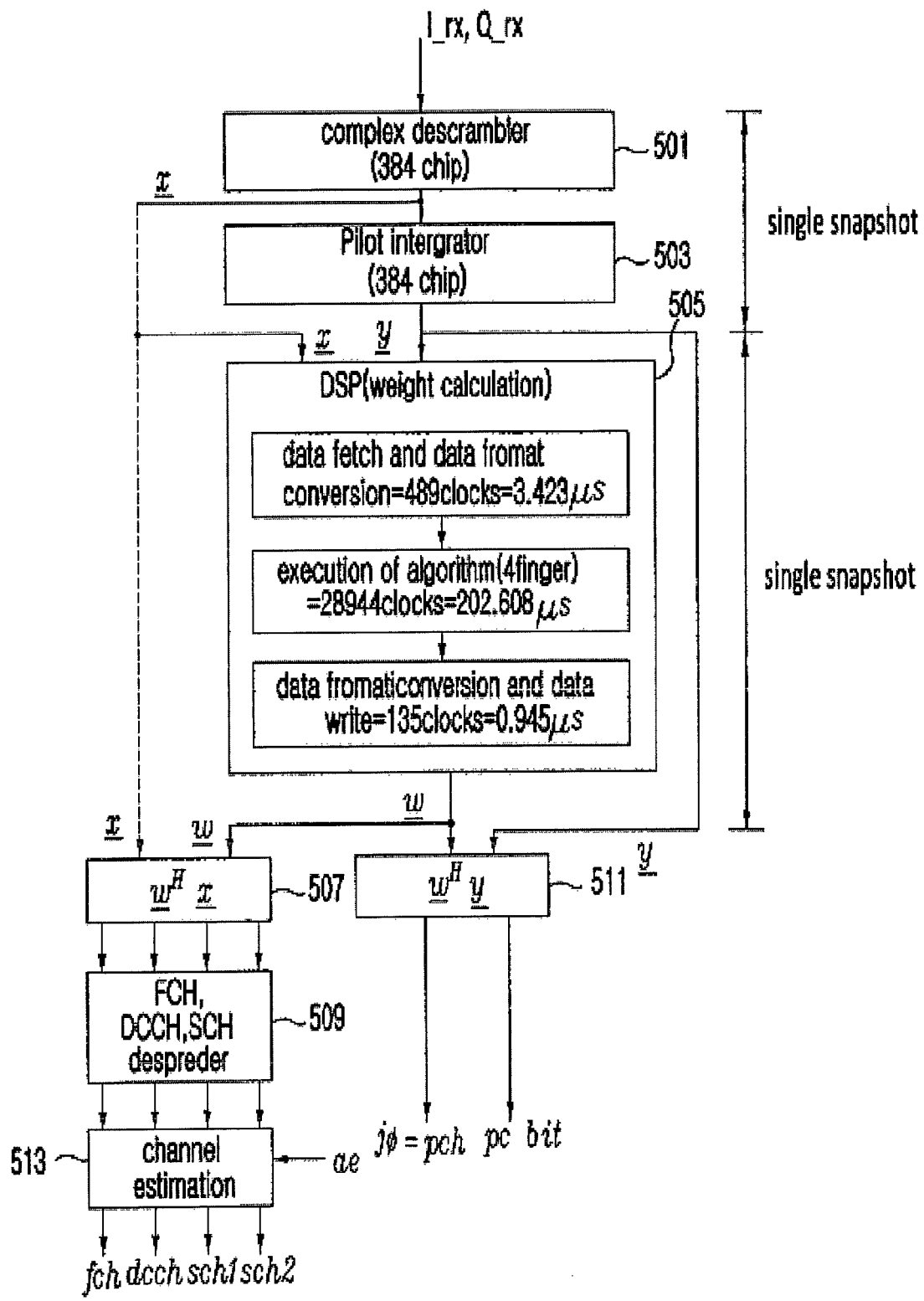
FIG. 12 illustrates a flow-chart of a desirable example of the demodulation method using the finger operating in mixed-rate, according to the present invention.
Figure 13:
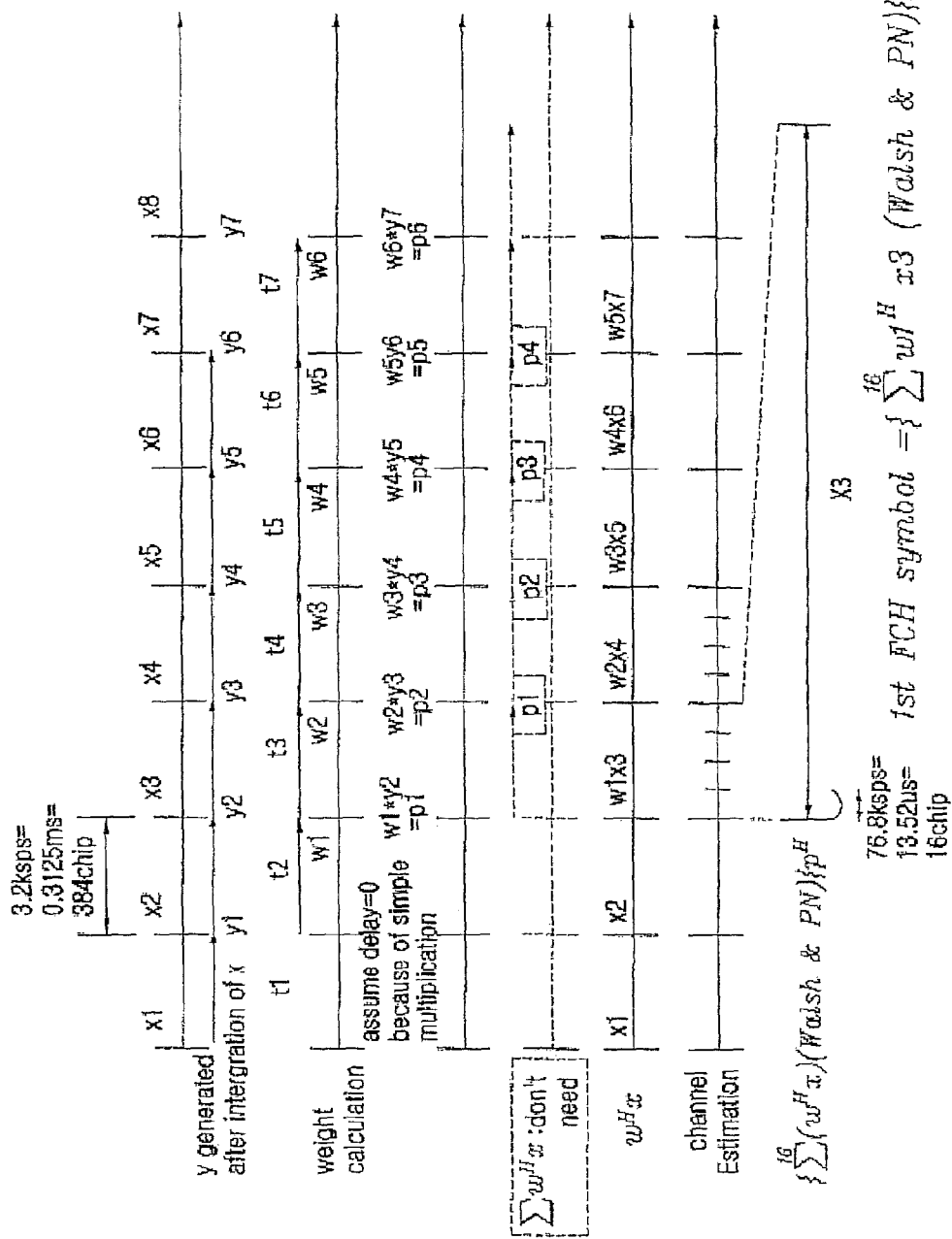
FIG. 13 illustrates how much delay is encountered in procedure of mixed-rate weighting itself in FIG. 12.

FIG. 12 illustrates a flow chart of the demodulation method using the finger in which the received signal are weighted in the mixed-rate as described in this disclosure. FIG. 13 illustrates how much processing delay is encountered in the demodulation procedure adopting the finger that operates in the mixed-rate.

According to FIG. 12, the demodulation method disclosed in this disclosure can be explained as follows: the received signal is descrambled in the complex descrambler (step 501) using the frame timing f_timing by multiplying the received signal with the PN code. Then, the pilot signal is produced by integrating the descrambled signal (x-vector signal) in order to use as input signal for computing the weight vector (step 503). The beamforming parameter, i.e., the weight vector, is computed using the descrambled received signal and the pilot integration signal (y-vector signal) (step 505). Computing time required for obtaining the weight vectors is dependent upon a processor and an algorithm used in the weight vector computing part, although it has been written as being a single snapshot period in example shown in this disclosure.

After the descrambled signal is multiplied by the weight vector in the general weighting part, the results of multiplications are summed up to produce each traffic channel signal (step 507). When the pilot signal is multiplied by the weight vector, it is desirable to weight the pilot signal through calculation of the phase delay, which is a delay between a reference antenna and each antenna element.

Then, each signal at traffic channels is retrieved separately (step 509) by correlating the array output with each of Walsh codes assigned to each corresponding channel. Also, the weighted pilot signal for compensating the phase distortion is applied to each of traffic channels separately to produce phase-compensated data (step 513).

In FIG. 13, time periods written as t1, t2, . . . , t7 denote the integration periods for descrambling the received signal in the pilot signal integrating part 120. The Results of the integration period are denoted as y1, y2, . . . , y7, respectively.

In more detail, the weight vector computing part 130 receives two inputs, one is the x-vector signal and the other is y-vector signal. As the y-vector signal is generated by integrating the x-vector signal, y1 in FIG. 13 is available after the integration of corresponding x1 is completed. Similarly, as the weight vector w1 uses both x1 and y1, the weight vector w1 is available after consuming another computation time, which is assumed as being one snapshot period for convenience in illustration. The weight vector w1, which is multiplied by y2, an output of the pilot signal demodulating part 12, is used for channel compensation of symbol duration.

From above, it is analysed that channel output (p1) for the duration of t1 is applied to the duration t3 which is delayed by two computation steps. This result comes from condition that there are no buffers between each block. If buffering blocks are used in this disclosure, even though time for obtaining the result is delayed (when w1 is applied to t1 duration, time for channel compensation is delayed by two computation steps is necessary), performance degradation due to such the delay time can be avoided.

Processing means according to this disclosure can be implemented through software and recorded on recording medium (CD-ROM, ROM, RAM, floppy disk, hard disk, magnetic-optical disk, etc.) that can be read through computer program for implementing.

Figure 14:
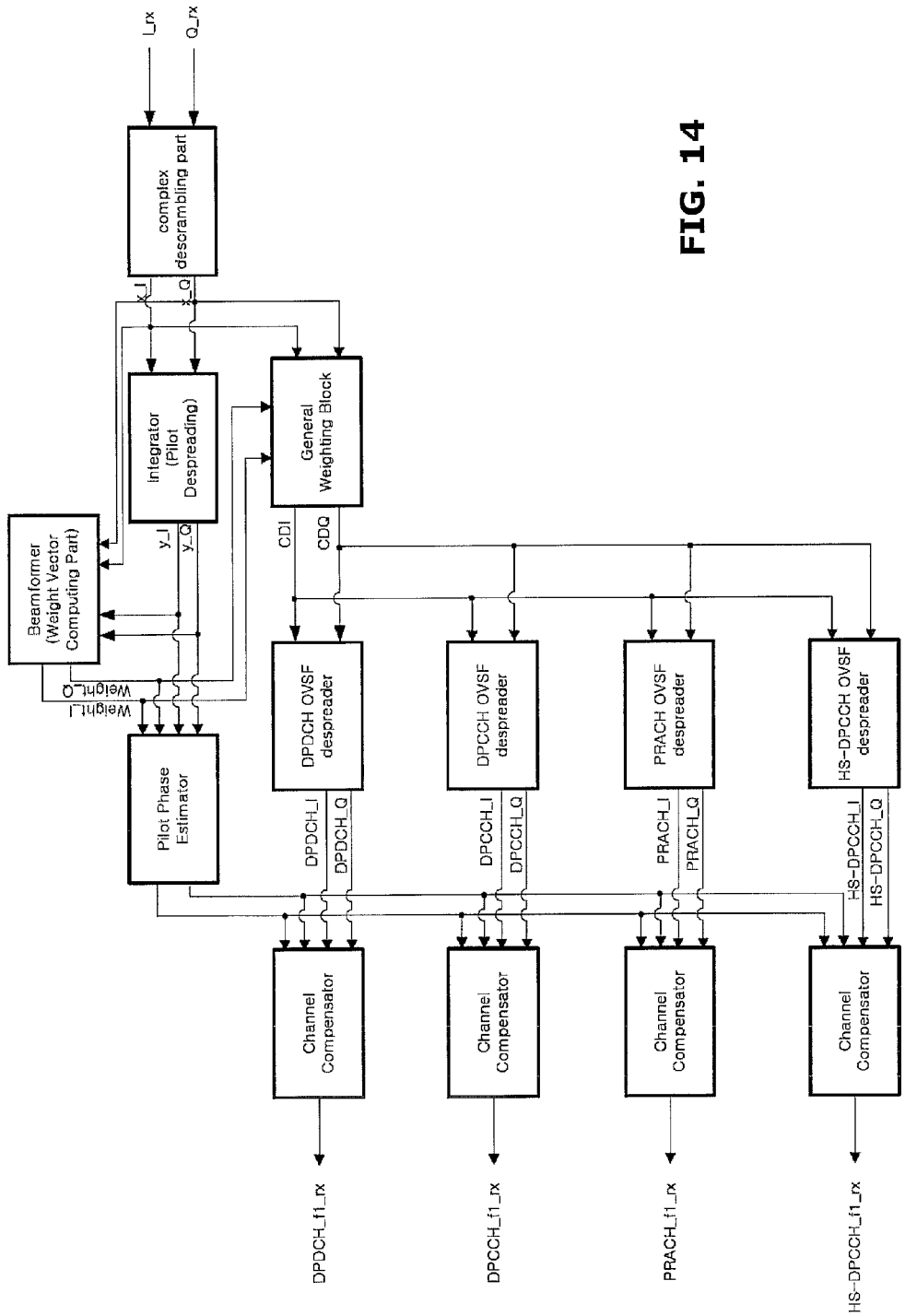
FIG. 14 is a block diagram illustrating an example of a WCDMA receiver having the weight vector calculation unit of FIG. 1.

This disclosure takes an example of apparatus operating in CDMA2000 (called IS-2000 or IMT-2000) but it is clear that the finger disclosed in this disclosure can be applied to such as WCDMA. Also, the data rate of traffic channels is to help understand meaning of this disclosure and not confined to CDMA2000 system. FIG. 14 is a block diagram illustrating an example of a WCDMA-based finger having the weight vector calculation unit of FIG. 1. Basically, since the weight vector calculation in the WCDMA-based receiver is the same as that in the CDMA2000-based receiver, the detailed description will be omitted. Optimum weight vector can be calculated by using the pilot signal in 3G mobile communication systems, because the traffic signal and the pilot signal are transmitted from mobile station. The mixed-rate weighting is possible because optimum weight vector using the pilot signal is applied to each traffic channel. If the mixed-rate weighting is compared with other weighting method (for example, the symbol-rate weighting or the chip-rate weighting), it has following properties: the application speed of weight vector is reduced to the chip-rate; another integration is not necessary as the despreded pilot signal is weighted when pilot signal is detected for channel estimation; and time difference between the calculated weight vector and the received signal applied into the weight vector is one chip duration faster than the chip-rate weighting. However, the chip-rate, the symbol-rate and the mixed rate are selectively used according to the applicable telecommunication system.

According to this disclosure, interference can be reduced dramatically and capacity of communication be increased as the weighting information is extracted from pilot channel which can have long integration interval. Furthermore, delay time necessary for signal processing can minimized and exact channel estimation is possible as the mixed-rate weighting is used in demodulation apparatus. Also, performance of searcher and tracker can be enhanced when the phase diversity technology is used. Then, system performance is enhanced remarkably as the exact phase compensation is accomplished by multiplying pilot signal received from the array antenna with weight vector obtained from weight-vector computing part.

Figure 15:
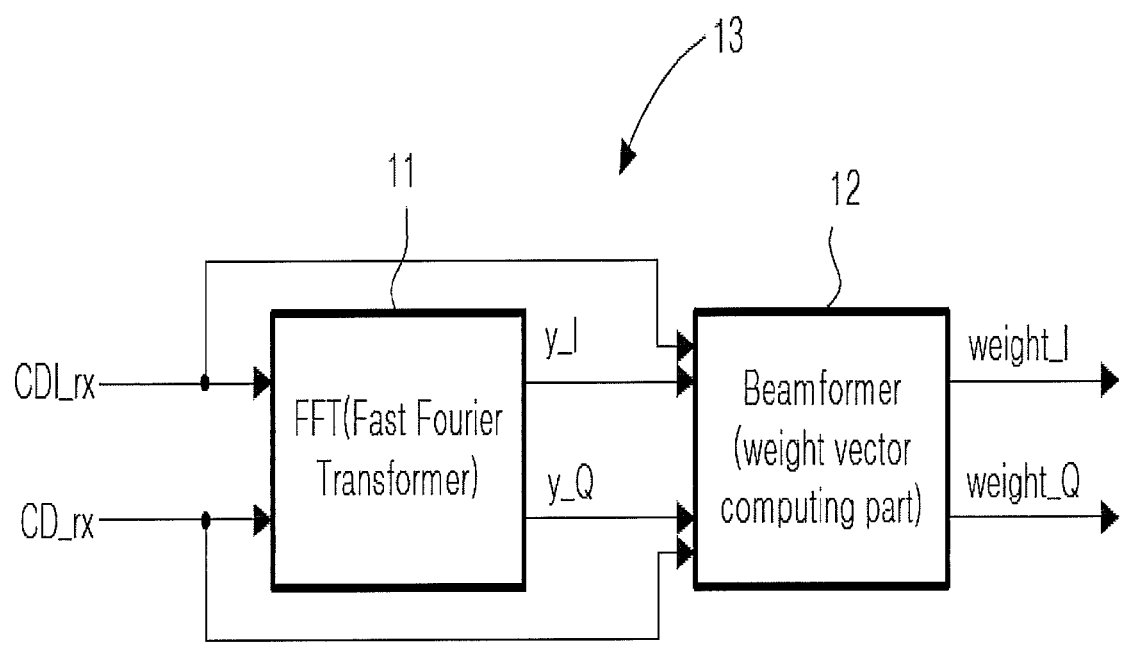
FIG. 15 is a block diagram illustrating an example of a weight vector calculation unit using x- and y-vector signals in an OFDMA-based telecommunication system according to another embodiment.

FIG. 15 is a block diagram illustrating an example of a weight vector calculation unit 13 using x- and y-vector signals in an OFDMA telecommunication system according to another embodiment. Referring to FIG. 15, a FFT (Fast Fourier Transformer) 11 is used as the integrator 1 of FIG. 1, based on the characteristics of the OFDMA telecommunication system. The y-vector signal y_I and y_Q in FIG. 15 is the same as that in FIG. 1 in view of the integration of the received signal I_rx and Q_rx. In the OFDMA telecommunication system, a weight vector computing part 12 also uses the received signal I_rx and Q_rx and the integration signal (y-vector signal y_I and y_Q) obtained by integrating the received signal I_rx and Q_rx.

Figure 16:
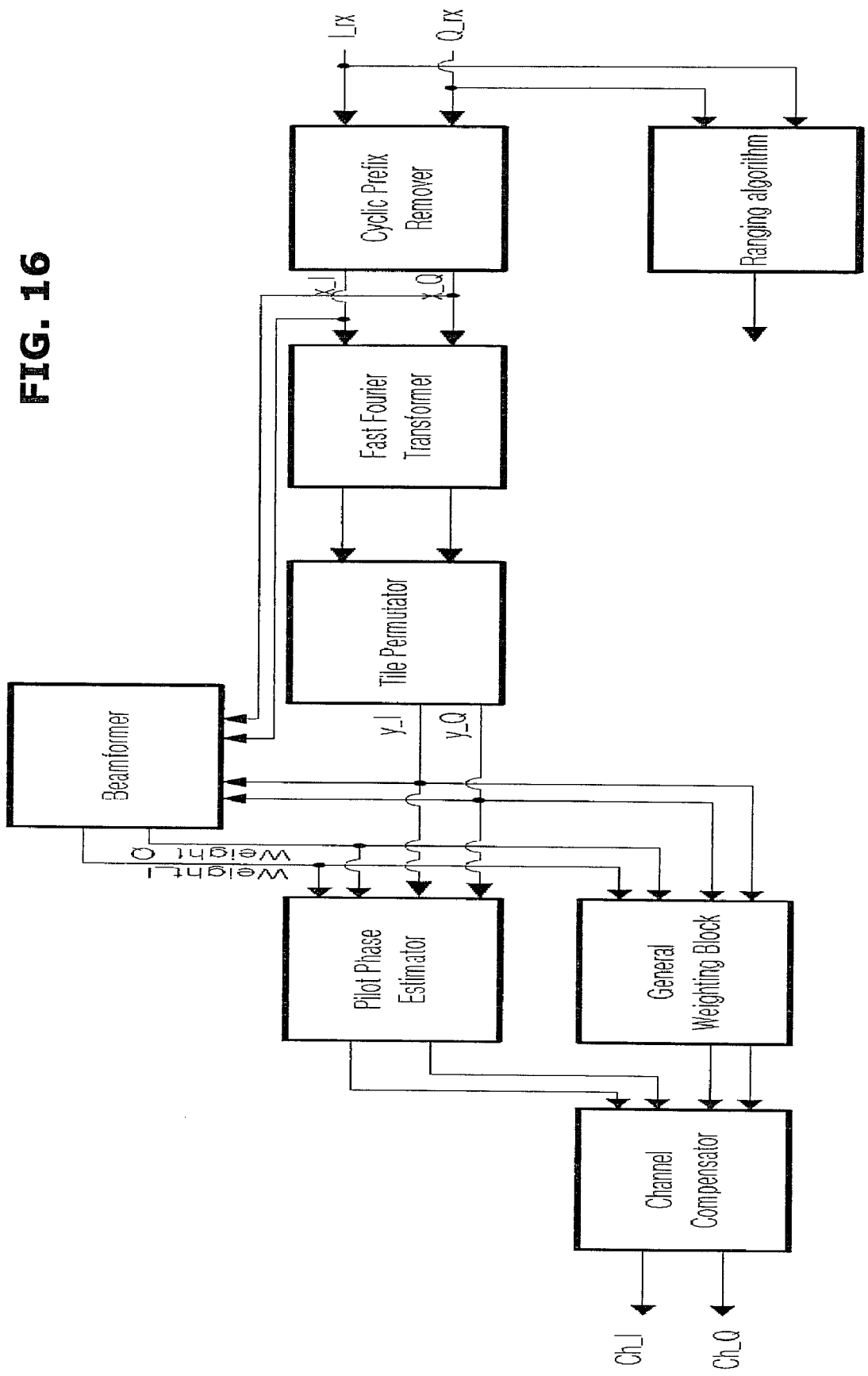
FIG. 16 is a block diagram illustrating an example of a WiMAX or WiBro receiver to which the weight vector calculation of FIG. 15 is applied.

In more detail, FIG. 16 is a block diagram illustrating an example of a WiMAX or WiBro receiver to which the weight vector calculation of FIG. 15 is applied. Referring to FIG. 16, the x-vector signal x_I and x_Q is obtained from an output signal of a cyclic prefix remover and the y-vector signal y_I and y_Q is directly obtained from a tile permutator after the x-vector signal x_I and x_Q is processed by the FFT. In similar to the CDMA2000 and WCDMA, it should be noted that the x-vector signal x_I and x_Q and the y-vector signal y_I and y_Q, which is obtained by integrating the x-vector signal x_I and x_Q, are processed by the weight vector computing part without a reference or training signal.

While the present invention has been described with respect to certain preferred embodiments, it will be apparent to those skilled in the art that various changes and modifications may be made without departing from the scope of the invention as defined in the following claims.

What is claimed is:

1. A telecommunication system having an array antenna system, wherein the array antenna system has a plurality of antenna elements for beamforming to each user, and wherein the telecommunication system is a Code Division Multiple Access 2000 (CDMA2000) or Wideband Code Division Multiple Access (WCDMA) telecommunication system, the telecommunication system comprising:
   an integration unit configured to produce an integrated signal by integrating a received signal from the antenna element;
   a weight vector computing unit configured to receive the received signal and/or the integrated signal in order to produce a weight vector for beamforming; and
   a pilot phase estimating unit configured to receive the integrated signal and the weight vector and produce a phase compensation signal to compensate a phase delay of a channel by multiplying the weight vector from the weight vector computing unit with the integrated signal in a symbol-rate.

2. The telecommunication system of claim 1, wherein the received signal is a descrambled signal which is descrambled by a descrambler.

3. The telecommunication system of claim 1, further comprising a general weighting unit configured to produces an array output by multiplying the received signal with the weight vector and summing up results of the multiplications in a chip-rate.

4. The telecommunication system of claim 1, further comprising a tracking part configured to generate frame tracking information in order to compensate for a small change in a path delay.

5. A telecommunication system having an array antenna system, wherein the array antenna system has a plurality of antenna elements for beamforming to each user, and wherein the telecommunication system is an Orthogonal Frequency-Division Multiple Access (OFDMA)-based telecommunication system, the telecommunication system comprising:
   a Fast Fourier Transformer (FFT) configured to produce a FFT-processed signal by processing a FFT operation on a received signal from the antenna element;
   a beamformer configured to receive the received signal and/or the FFT-processed signal in order to produce a weight vector for beamforming; and
   a pilot phase estimator configured to receive the FFT-processed signal and the weight vector and produce a phase compensation signal to compensate a phase delay of a channel by multiplying the weight vector from the beamformer with the FFT-processed signal.

6. The telecommunication system of claim 5, wherein the telecommunication system is a Worldwide Interoperability for Microwave Access (WiMAX) or Wireless Broadband (WiBro) telecommunication system.

7. The telecommunication system of claim 6, wherein the received signal is a signal which is generated by a cyclic prefix remover.

8. The telecommunication system of claim 7, further comprising a tile permutator wherein the FFT receives the received signal from the cyclic prefix remover and transmits the FFT-processed signal to the tile permutator.

9. An array antenna telecommunication system comprising:
   a weight vector computing unit for beamforming; and
   a pilot phase estimating unit for phase compensation, wherein the telecommunication system is a Code Division Multiple Access 2000 (CDMA2000) or Wideband Code Division Multiple Access (WCDMA) telecommunication system, and
   wherein the weight vector computing unit comprises an algorithm executing unit configured to compute a weight vector using input signals consisting of a received signal from an antenna element and an integrated signal and an integration unit configured to produce the integrated signal by integrating the received signal from the antenna element, and
   wherein the pilot phase estimating unit is configured to receive the integrated signal and the weight vector and produce a phase compensation signal to compensate a phase delay of a channel by multiplying the weight vector from the algorithm executing unit with the integrated signal in a symbol-rate.

10. The telecommunication system of claim 9, wherein the received signal is a descrambled signal which is descrambled by a descrambler.

11. The telecommunication system of claim 9, further comprising a general weighting unit configured to produce an array output by multiplying the received signal with the weight vector and summing up results of the multiplications in a chip-rate.

12. The telecommunication system of claim 9, further comprising a tracking part configured to generate frame tracking information in order to compensate for a small change in a path delay.

13. An array antenna telecommunication system comprising:
   a weight vector computing unit for beamforming; and
   a pilot phase estimator for phase compensation, wherein the telecommunication system is an Orthogonal Frequency-Division Multiple Access (OFDMA)-based telecommunication system, and
   wherein the weight vector computing unit comprises a beamformer configured to compute a weight vector using input signals consisting of a received signal from an antenna element and a Fast Fourier Transformer (FFT)-processed signal, and a Fast Fourier Transformer (FFT) configured to produce the FFT-processed signal by processing a FFT operation on the received signal from the antenna element, and
   wherein a pilot phase estimator configured to receive the FFT-processed signal and the weight vector and produce a phase compensation signal to compensate a phase delay of a channel by multiplying the weight vector from the weight vector computing unit with the FFT-processed signal.

14. The telecommunication system of claim 13, wherein the array antenna telecommunication system is a Worldwide Interoperability for Microwave Access (WiMAX) or Wireless Broadband (WiBro) telecommunication system.

15. The telecommunication system of claim 14, wherein the received signal is a signal which is generated by a cyclic prefix remover.

16. The telecommunication system of claim 15, further comprising a tile permutator, wherein the FFT receives the received signal from the cyclic prefix remover and transmits the FFT-processed signal to the tile permutator.

* * * * *